US010683931B2

(12) United States Patent
Hattori et al.

(10) Patent No.: US 10,683,931 B2
(45) Date of Patent: Jun. 16, 2020

(54) CONTROL APPARATUS FOR VEHICLE DRIVE-FORCE TRANSMITTING APPARATUS

(71) Applicant: TOYOTA JIDOSHA KABUSHIKI KAISHA, Toyota-shi, Aichi (JP)

(72) Inventors: Kunio Hattori, Nagoya (JP); Taichi Washio, Okazaki (JP); Takuro Shimazu, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 15 days.

(21) Appl. No.: 16/232,873

(22) Filed: Dec. 26, 2018

(65) Prior Publication Data
US 2019/0195359 A1    Jun. 27, 2019

(30) Foreign Application Priority Data

Dec. 27, 2017  (JP) .................................. 2017-252412

(51) Int. Cl.
| | |
|---|---|
| *F16H 61/12* | (2010.01) |
| *F16H 61/662* | (2006.01) |
| *F16H 9/18* | (2006.01) |
| *F16H 61/70* | (2006.01) |
| *F16H 37/08* | (2006.01) |

(52) U.S. Cl.
CPC ......... *F16H 61/66272* (2013.01); *F16H 9/18* (2013.01); *F16H 37/0846* (2013.01); *F16H 61/12* (2013.01); *F16H 61/702* (2013.01)

(58) Field of Classification Search
None
See application file for complete search history.

(56) References Cited

U.S. PATENT DOCUMENTS

| | | | | |
|---|---|---|---|---|
| 7,670,239 | B2 * | 3/2010 | Suzuki | ................... F16H 61/12 474/18 |
| 8,012,051 | B2 * | 9/2011 | Soga | ....................... F16H 61/12 474/110 |
| 8,798,877 | B2 * | 8/2014 | Ayabe | ............... F16H 61/66259 701/51 |

(Continued)

FOREIGN PATENT DOCUMENTS

| | | |
|---|---|---|
| WO | 2012/017536 A1 | 2/2012 |
| WO | 2012/026043 A1 | 3/2012 |

*Primary Examiner* — Dirk Wright
(74) *Attorney, Agent, or Firm* — Oliff PLC

(57) ABSTRACT

A control apparatus for a drive-force transmitting apparatus that includes a transmission having primary and secondary pulleys. When a detection accuracy of rotational speed of the primary and secondary pulley is not assured, the control apparatus sets each of (i) a secondary-thrust calculation thrust ratio value used for calculation of a secondary thrust that is to be applied to the secondary pulley and (ii) a primary-thrust calculation thrust ratio value used for calculation of a primary thrust that is to be applied to the primary pulley, such that each of the secondary-thrust calculation thrust ratio value and the primary-thrust calculation thrust ratio value is dependent on a result of a determination as to whether an actual gear ratio of the transmission is the highest gear ratio and a result of a determination as to whether an input torque inputted to the transmission is lower than a given torque value.

12 Claims, 11 Drawing Sheets

(56) References Cited

U.S. PATENT DOCUMENTS

| | | | |
|---|---|---|---|
| 8,914,206 B2* | 12/2014 | Hattori | F16H 9/125 |
| | | | 701/51 |
| 2013/0165282 A1 | 6/2013 | Hattori et al. | |
| 2013/0218429 A1 | 8/2013 | Ayabe et al. | |
| 2018/0080549 A1* | 3/2018 | Ozono | F16H 1/0021 |
| 2018/0259066 A1* | 9/2018 | Sudo | F16H 59/42 |

* cited by examiner

CONTROL APPARATUS FOR VEHICLE DRIVE-FORCE TRANSMITTING APPARATUS

This application claims priority from Japanese Patent Application No. 2017-252412 filed on Dec. 27, 2017, the disclosure of which is herein incorporated by reference in its entirety.

Field of the Invention

The present invention relates to a control apparatus for a drive-force transmitting apparatus that is to be provided in a vehicle, wherein the drive-force transmitting apparatus includes a continuously-variable transmission mechanism provided in a drive-force transmitting path between a drive force source and drive wheels of the vehicle.

Background of the Invention

There is known a control apparatus for a vehicle drive-force transmitting apparatus including a primary pulley, a secondary pulley and a transfer element that is looped over the primary and secondary pulleys, so as to transmit a drive force of a drive force source toward drive wheels. WO2012/017536 discloses such a vehicle control apparatus, teaching that, in a case where it is determined that a sufficient detection accuracy is not assured to detect rotational speeds that are used in calculation of an actual value of a gear ratio of a continuously-variable transmission mechanism, if the actual value is already a highest gear ratio of the continuously-variable transmission mechanism, a primary thrust, which is applied to the primary pulley for establishing the highest gear ratio, is reduced by an amount corresponding to a control variation, for thereby maintaining the highest gear ratio, and if the actual value is not yet the highest gear ratio, a secondary thrust, which is applied to the secondary pulley for establishing the highest gear ratio, is increased by an amount corresponding to the control variation, for thereby changing the actual value toward the highest gear ratio. It is noted that the gear ratio is defined as "rotational speed of input-side rotary member/rotational speed of output-side rotary member". For example, the gear ratio of the above-described continuously-variable transmission is defined as "rotational speed of primary pulley/rotational speed of secondary pulley". Further, the gear ratio of the above-described drive-force transmitting apparatus is defined as "rotational speed of input rotary member (to which the drive force of the drive force source is transmitted)/rotational speed of output rotary member (from which the drive force is outputted to the drive wheels)". A vehicle running speed could be lower as the gear ratio is higher, and could be higher as the gear ratio is lower. For example, the highest gear ratio of the continuously-variable transmission mechanism can be expressed also as a lowest-speed gear ratio.

SUMMARY OF THE INVENTION

By the way, in view of reduction of an energy consumption amount, it is preferable that each of the primary and secondary thrusts applied to the primary and secondary pulleys for establishing the target gear ratio is held in a range that enables prevention of slippage of the transfer element without the applied thrust being excessively increased. Therefore, when an input torque inputted to the continuously-variable transmission mechanism is small, the primary thrust, which is applied to the primary pulley for establishing the highest gear ratio, is reduced. However, there is a case where there is no room for reduction of the primary thrust by an amount corresponding to the control variation. In such a case, the highest gear ratio could not be maintained.

The present invention was made in view of the background art described above. It is therefore an object of the present invention to provide a control apparatus for a vehicle drive-force transmitting apparatus, which is capable of maintaining a highest gear ratio of a continuously-variable transmission mechanism without unnecessarily increasing a secondary thrust applied to a secondary pulley, in a state in which a sufficient detection accuracy is not assured to detect rotational speeds that are used in calculation of an actual value of the gear ratio of the continuously-variable transmission mechanism.

The object indicated above is achieved according to the following aspects of the present invention.

According to a first aspect of the invention, there is provided a control apparatus for a drive-force transmitting apparatus that is to be provided in a vehicle having a drive force source and drive wheels. The drive-force transmitting apparatus includes: a continuously-variable transmission mechanism which is configured to transmit a drive force of the drive force source toward the drive wheels, and which includes a primary pulley, a secondary pulley, and a transfer element that is looped over the primary and secondary pulleys, such that the primary pulley includes a primary hydraulic actuator configured to generate a primary thrust, based on which the transfer element is to be clamped by the primary pulley, and such that the secondary pulley includes a secondary hydraulic actuator configured to generate a secondary thrust, based on which the transfer element is to be clamped by the secondary pulley. The control apparatus includes: (a) a detection-accuracy determining portion configured to make a determination as to whether an accuracy of detection of at least one rotational speed that is to be used for calculation of an actual value of a gear ratio of the continuously-variable transmission mechanism, is assured or not; (b) a highest-gear-ratio determining portion configured to make a determination as to whether an actual value of a gear ratio of the continuously-variable transmission mechanism is a highest gear ratio or not; (c) an input-torque determining portion configured to make a determination as to whether an input torque inputted to the continuously-variable transmission mechanism is lower than a given torque value or not; and (d) a transmission-shifting control portion configured to control a thrust ratio that is a ratio of the secondary thrust to the primary thrust, and to calculate, based on the input torque, a target-gear-ratio establishing ratio value of the thrust ratio that is for establishing a target value of the gear ratio. When it is determined that the accuracy of the detection of the at least one rotational speed is not assured, the transmission-shifting control portion is configured to set each of (i) a secondary-thrust calculation thrust ratio value of the thrust ratio used for calculation of the secondary thrust based on the primary thrust and (ii) a primary-thrust calculation thrust ratio value of the thrust ratio used for calculation of the primary thrust based on the secondary thrust, by using a base thrust ratio that is the target-gear-ratio establishing ratio value of the thrust ratio, such that each of the set secondary-thrust calculation thrust ratio value and the set primary-thrust calculation thrust ratio value is dependent on a result of the determination as to whether the actual value of the gear ratio is the highest gear ratio or not and a result of the determination as to whether the input torque is lower than the given torque value or not. For example, each of the secondary-thrust calculation thrust ratio value and the primary-thrust calculation thrust ratio value is set to a value whose difference from the base thrust ratio is dependent on the result of the determination as to whether the actual value of the gear ratio is the highest gear ratio or not and the result of the determination as to whether the input torque is lower than the given torque value or not. It is noted that the detection-accuracy determining portion determines that the accuracy of detection of the at least one rotational speed is not assured, for example, when at least one of the at least one rotational speed is lower than a minimum speed value.

According to a second aspect of the invention, in the control apparatus according to the first aspect of the invention, when it is determined that the accuracy of the detection of the at least one rotational speed is not assured, if it is determined that the actual value of the gear ratio is the highest gear ratio and the input torque is not lower than the given torque value, the transmission-shifting control portion is configured to set the secondary-thrust calculation thrust ratio value to the target-gear-ratio establishing ratio value and to set the primary-thrust calculation thrust ratio value to a higher ratio value that is higher than the target-gear-ratio establishing ratio value.

According to a third aspect of the invention, in the control apparatus according to the first or second aspect of the invention, when it is determined that the accuracy of the detection of the at least one rotational speed is not assured, if it is determined that the actual value of the gear ratio is the highest gear ratio and the input torque is lower than the given torque value, the transmission-shifting control portion is configured to set the secondary-thrust calculation thrust ratio value to a higher ratio value that is higher than the target-gear-ratio establishing ratio value and to set the primary-thrust calculation thrust ratio value to a higher ratio value that is higher than the target-gear-ratio establishing ratio value.

According to a fourth aspect of the invention, in the control apparatus according to any one of the first through third aspects of the invention, the transmission-shifting control portion is configured to make a determination as to whether the target value of the gear ratio of the continuously-variable transmission mechanism is the highest gear ratio or not, wherein, when it is determined that the accuracy of the detection of the at least one rotational speed is not assured, if it is determined that the actual value of the gear ratio is not the highest gear ratio, the target value of the gear ratio is the highest gear ratio and the input torque is not lower than the given torque value, the transmission-shifting control portion is configured to set the secondary-thrust calculation thrust ratio value to the target-gear-ratio establishing ratio value and to set the primary-thrust calculation thrust ratio value to the target-gear-ratio establishing ratio value.

According to a fifth aspect of the invention, in the control apparatus according to any one of the first through fourth aspects of the invention, the transmission-shifting control portion is configured to make a determination as to whether the target value of the gear ratio of the continuously-variable transmission mechanism is the highest gear ratio or not, wherein, when it is determined that the accuracy of the detection of the at least one rotational speed is not assured, if it is determined that the actual value of the gear ratio is not the highest gear ratio, the target value of the gear ratio is the highest gear ratio and the input torque is lower than the given torque value, the transmission-shifting control portion is configured to set the secondary-thrust calculation thrust ratio value to a higher ratio value that is higher than the target-gear-ratio establishing ratio value and to set the primary-thrust calculation thrust ratio value to a higher ratio value that is higher than the target-gear-ratio establishing ratio value.

According to a sixth aspect of the invention, in the control apparatus according to any one of the first through fifth aspects of the invention, the transmission-shifting control portion is configured to make a determination as to whether the target value of the gear ratio of the continuously-variable transmission mechanism is the highest gear ratio or not, wherein, when it is determined that the accuracy of the detection of the at least one rotational speed is not assured, if it is determined that the actual value of the gear ratio is not the highest gear ratio and the target value of the gear ratio is not the highest gear ratio, the transmission-shifting control portion is configured to set the secondary-thrust calculation thrust ratio value to the target-gear-ratio establishing ratio value and to set the primary-thrust calculation thrust ratio value to the target-gear-ratio establishing ratio value.

According to a seventh aspect of the invention, in the control apparatus according to any one of the first through sixth aspects of the invention, when it is determined that the accuracy of the detection of the at least one rotational speed is not assured, the transmission-shifting control portion is configured to set each of the secondary-thrust calculation thrust ratio value and the primary-thrust calculation thrust ratio value, to one of the target-gear-ratio establishing ratio value and a higher ratio value that is higher than the target-gear-ratio establishing ratio value, which is selected depending on the result of the determinations as to whether the actual value of the gear ratio is the highest gear ratio or not and the result of the determination as to whether the input torque is lower than the given torque value or not, such that a difference between the primary thrust and the secondary thrust is made larger when at least one of the secondary-thrust calculation thrust ratio value and the primary-thrust calculation thrust ratio value is set to the higher ratio value than when each of the secondary-thrust calculation thrust ratio value and the primary-thrust calculation thrust ratio value is set to the target-gear-ratio establishing ratio value.

According to an eighth aspect of the invention, in the control apparatus according to any one of the first through seventh aspects of the invention, the drive-force transmitting apparatus further includes: an input rotary member to which the drive force is to be transmitted from the drive force source; an output rotary member from which the drive force is to be outputted to the drive wheels; and a gear mechanism configured to provide at least one gear ratio, wherein the drive-force transmitting apparatus defines a plurality of drive-force transmitting paths that are provided in parallel with each other between the input rotary member and the output rotary member, wherein the plurality of drive-force transmitting paths include a first drive-force transmitting path through which the drive force is to be transmitted by the gear mechanism from the input rotary member toward the output rotary member when the first drive-force transmitting path is established by engagement of a first engagement device, and wherein the plurality of drive-force transmitting paths includes a second drive-force transmitting path through which the drive force is to be transmitted by the continuously-variable transmission mechanism from the input rotary member toward the output rotary member when the second drive-force transmitting path is established by engagement of a second engagement device.

According to a ninth aspect of the invention, in the control apparatus according to eight aspect of the invention, the input-torque determining portion is configured to make a determination as to whether the second engagement device is fully engaged or not, wherein, when it is determined that the accuracy of the detection of the at least one rotational speed is not assured, if it is determined that the second engagement device is fully engaged, the transmission-shifting control portion is configured to set each of the secondary-thrust calculation thrust ratio value and the primary-thrust calculation thrust ratio value, dependently on a result of the determination as to whether the input torque is lower than the given torque value or not, and wherein, when it is determined that the accuracy of the detection of the at least one rotational speed is not assured, if it is determined that the second engagement device is not fully engaged, it is regarded that there is a determination that the input torque is lower than the given torque value, irrespective of whether the input torque is actually lower than the given torque value or not, and the transmission-shifting control portion is configured to set each of the secondary-thrust calculation thrust ratio value and the primary-thrust calculation thrust ratio value, based on the determination that the input torque is lower than the given torque value.

In the control apparatus according to the first aspect of the invention, when it is determined that the accuracy of the detection of the at least one rotational speed is not assured, the transmission-shifting control portion sets each of the secondary-thrust calculation thrust ratio value and the primary-thrust calculation thrust ratio value, by using the base thrust ratio that is the target-gear-ratio establishing ratio value of the thrust ratio, such that each of the set secondary-thrust calculation thrust ratio value and the set primary-thrust calculation thrust ratio value is dependent on the result of the determination as to whether the actual value of the gear ratio is the highest gear ratio or not and the result of the determination as to whether the input torque is lower than the given torque value or not. Thus, the primary-thrust calculation thrust ratio value can be set to, for example, a value that reduces the primary thrust so as to reliably maintain the highest gear ratio, dependently on the result of the determination as to whether the actual value of the gear ratio is the highest gear ratio or not. Further, the secondary-thrust calculation thrust ratio value can be set to, for example, a value that increases the secondary thrust or a value that does not unnecessarily increase the secondary thrust, dependently on the result of the determination as to whether the input torque is lower than the given torque value or not. Therefore, in a state in which the at least one rotational speed, which is used for calculation of the actual value of the gear ratio of the continuously-variable transmission mechanism, is not assured, the highest gear ratio can be maintained without unnecessarily increasing the secondary thrust.

In the control apparatus according to the second aspect of the invention, when it is determined that the accuracy of the detection of the at least one rotational speed is not assured, if it determined that the actual value of the gear ratio is the highest gear ratio and the input torque is not lower than the given torque value, the transmission-shifting control portion is configured to set the secondary-thrust calculation thrust ratio value to the target-gear-ratio establishing ratio value and to set the primary-thrust calculation thrust ratio value to the higher ratio value that is higher than the target-gear-ratio establishing ratio value. Thus, the primary thrust is reduced to reliably maintain the highest gear ratio, without the secondary thrust being unnecessarily increased.

In the control apparatus according to the third aspect of the invention, when it is determined that the accuracy of the detection of the at least one rotational speed is not assured, if it is determined that the actual value of the gear ratio is the highest gear ratio and the input torque is lower than the given torque value, the transmission-shifting control portion is configured to set the secondary-thrust calculation thrust ratio value to the higher ratio value and to set the primary-thrust calculation thrust ratio value to the higher ratio value. Thus, the secondary thrust is increased and the primary thrust is reduced, so as to reliably maintain the highest gear ratio.

In the control apparatus according to the fourth aspect of the invention, when it is determined that the accuracy of the detection of the at least one rotational speed is not assured, if it is determined that the actual value of the gear ratio is not the highest gear ratio, the target value of the gear ratio is the highest gear ratio and the input torque is not lower than the given torque value, the transmission-shifting control portion is configured to set the secondary-thrust calculation thrust ratio value to the target-gear-ratio establishing ratio value and to set the primary-thrust calculation thrust ratio value to the target-gear-ratio establishing ratio value. Thus, the secondary thrust is not unnecessarily increased.

In the control apparatus according to the fifth aspect of the invention, when it is determined that the accuracy of the detection of the at least one rotational speed is not assured, if it is determined that the actual value of the gear ratio is not the highest gear ratio, the target value of the gear ratio is the highest gear ratio and the input torque is lower than the given torque value, the transmission-shifting control portion is configured to set the secondary-thrust calculation thrust ratio value to a higher ratio value that is higher than the target-gear-ratio establishing ratio value and to set the primary-thrust calculation thrust ratio value to a higher ratio value that is higher than the target-gear-ratio establishing ratio value. Thus, the secondary thrust is increased to avoid a slippage of the transfer element, and the primary thrust is reduced to facilitate establishment of the target gear ratio.

In the control apparatus according to the sixth aspect of the invention, when it is determined that the accuracy of the detection of the at least one rotational speed is not assured, if it is determined that the actual value of the gear ratio is not the highest gear ratio and the target value of the gear ratio is not the highest gear ratio, the transmission-shifting control portion is configured to set the secondary-thrust calculation thrust ratio value to the target-gear-ratio establishing ratio value and to set the primary-thrust calculation thrust ratio value to the target-gear-ratio establishing ratio value. Thus, the secondary thrust is not unnecessarily increased.

In the control apparatus according to the seventh aspect of the invention, when it is determined that the accuracy of the detection of the at least one rotational speed is not assured, the transmission-shifting control portion is configured to set each of the secondary-thrust calculation thrust ratio value and the primary-thrust calculation thrust ratio value, to one of the target-gear-ratio establishing ratio value and a higher ratio value that is higher than the target-gear-ratio establishing ratio value, which is selected depending on the result of the determinations as to whether the actual value of the gear ratio is the highest gear ratio or not and the result of the determination as to whether the input torque is lower than the given torque value or not, such that a difference between the primary thrust and the secondary thrust is made larger when at least one of the secondary-thrust calculation thrust ratio value and the primary-thrust calculation thrust ratio value is set to the higher ratio value than when each of the secondary-thrust calculation thrust ratio value and the primary-thrust calculation thrust ratio value is set to the target-gear-ratio establishing ratio value. Thus, with at least one of the secondary-thrust calculation thrust ratio value and the primary-thrust calculation thrust ratio value being set to the higher ratio value, the difference between the primary thrust and the secondary thrust is made larger than when each of the secondary-thrust calculation thrust ratio value and the primary-thrust calculation thrust ratio value is set to the target-gear-ratio establishing ratio value, namely, the highest gear ratio can be more reliably maintained.

In the control apparatus according to the eighth aspect of the invention, where the drive-force transmitting apparatus defines a plurality of drive-force transmitting paths that are provided in parallel with each other between the input rotary member and the output rotary member, wherein the plurality of drive-force transmitting paths include the first drive-force transmitting path through which the drive force is to be transmitted by the gear mechanism from the input rotary member toward the output rotary member when the first drive-force transmitting path is established by engagement of a first engagement device, and wherein the plurality of drive-force transmitting paths includes the second drive-force transmitting path through which the drive force is to be transmitted by the continuously-variable transmission mechanism from the input rotary member toward the output rotary member when the second drive-force transmitting path is established by engagement of a second engagement device, it is possible to maintain the highest gear ratio without unnecessarily increasing the secondary thrust, even when the detection accuracy of the at least one rotational speed, which is to be used for the calculation of the actual gear ratio of the continuously-variable transmission mechanism, is not assured.

In the control apparatus according to the ninth aspect of the invention, when it is determined that the accuracy of the detection of the at least one rotational speed is not assured, if it is determined that the second engagement device is fully engaged, the transmission-shifting control portion is configured to set each of the secondary-thrust calculation thrust ratio value and the primary-thrust calculation thrust ratio value, dependently on a result of the determination as to whether the input torque is lower than the given torque value or not, for example, to set each of the secondary-thrust calculation thrust ratio value and the primary-thrust calculation thrust ratio value, to one of the target-gear-ratio establishing ratio value and a higher ratio value that is higher than the target-gear-ratio establishing ratio value, which is selected depending on the result of the determination as to whether the input torque is lower than the given torque value or not. Thus, in this case, for example, the primary-thrust calculation thrust ratio value can be set to the higher ratio value for increasing the primary thrust while the secondary-thrust calculation thrust ratio value can be set to the higher ratio value for increasing the secondary thrust or to the target-gear-ratio establishing ratio value for not unnecessarily increasing the secondary thrust, such that the highest gear ratio is reliably maintained. On the other hand, when it is determined that the accuracy of the detection of the at least one rotational speed is not assured, if it is determined that the second engagement device is not fully engaged, it is regarded that there is the determination that the input torque is lower than the given torque value, irrespective of whether the input torque is actually lower than the given torque value or not, and the transmission-shifting control portion is configured to set each of the secondary-thrust calculation thrust ratio value and the primary-thrust calculation thrust ratio value, based on the determination that the input torque is lower than the given torque value, for example, to set each of the secondary-thrust calculation thrust ratio value and the primary-thrust calculation thrust ratio value, to one of the target-gear-ratio establishing ratio value and the higher ratio value, which is selected based on the determination that the input torque is lower than the given torque value. Therefore, each of the secondary-thrust calculation thrust ratio value and the primary-thrust calculation thrust ratio value can be set to a value suitable for a state in which the input torque is lower than the given torque value, when the second engagement device is not fully engaged, namely, when the input torque is substantially not higher than a value corresponding to a torque capacity of the second engagement device.

DETAILED DESCRIPTION OF PREFERRED EMBODIMENTS

In the embodiments of the present invention, each of the primary pulley (i.e., input-side pulley) and the secondary pulley (i.e., output-side pulley) includes, for example, a fixed sheave, a movable sheave and a hydraulic actuator, which is configured to apply a thrust for changing a width of an annular groove defined between the fixed and movable sheaves of a corresponding one of the primary and secondary pulleys. A vehicle provided with the above-described drive-force transmitting apparatus includes a hydraulic control unit configured to control pulley hydraulic pressures supplied as working hydraulic pressures to the respective hydraulic actuators, independently of each other. The hydraulic control unit may be configured to control an amount of flow of a working fluid supplied to each of the hydraulic actuators so as to consequently generate the pulley hydraulic pressures, for example. A shifting control operation is performed by the hydraulic control unit to execute a shifting action to establish a target gear ratio while preventing slippage of a transfer element in the continuously-variable transmission mechanism, by controlling the thrust (=pulley hydraulic pressure*pressure receiving area) applied to each of the primary and secondary pulleys. The transfer element, which is looped over the primary and secondary pulleys, may be a compression-type endless annular transmission belt including at least one endless annular hoop and a multiplicity of thick-plate-shaped block elements that are held by the at least one endless annular hoop so as to be arranged in their thickness direction corresponding to a circumferential direction of the transmission belt, along the at least one endless annular hoop, or alternatively, a tension-type belt constituting an endless annular link chain including a plurality of link plates alternately superposed and mutually connected at their end portions through connecting pins. The above-described continuously variable transmission mechanism is a known belt-type continuously-variable transmission, and can be broadly interpreted to conceptually encompass not only the belt-type continuously-variable transmission but also a chain-type continuously-variable transmission.

The above-described drive force source is, for example, an internal combustion engine such as a gasoline engine and a diesel engine generating a drive force by combustion of fuel supplied thereto. The vehicle may be equipped with, in addition to or in place of a drive force source in the form of the engine, another drive force source in the form of, for example, an electric motor.

Hereinafter, preferred embodiments of the invention will be described in detail with reference to the accompanying drawings.

First Embodiment

Figure 1:
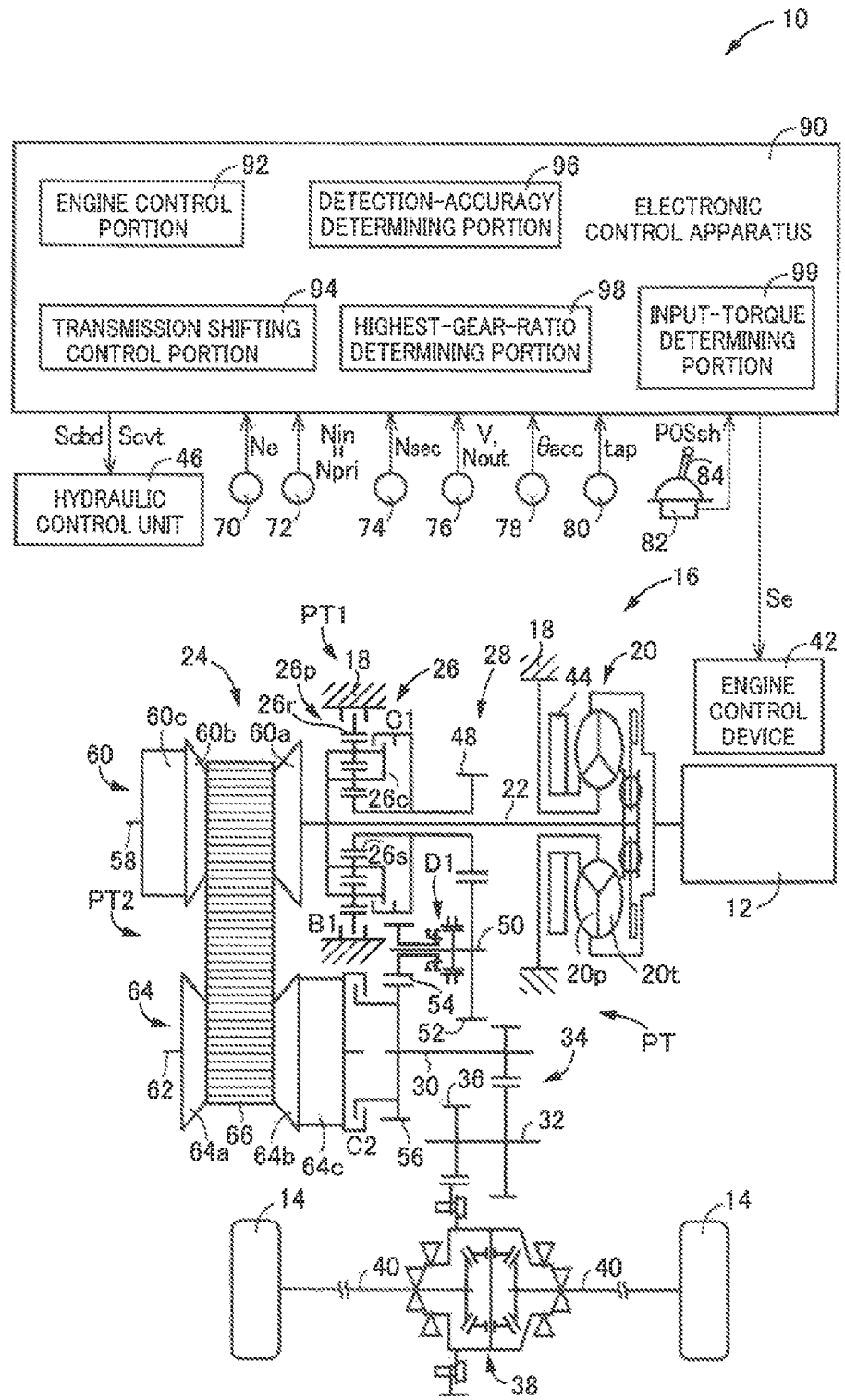
FIG. 1 is a schematic view showing a construction of a vehicle to be controlled by a control apparatus according to the present invention, and major control functions and control portions of the control apparatus.

FIG. 1 is a schematic view showing a construction of a vehicle 10 to be controlled by a control apparatus according to the present invention, and major control functions and control portions of the control apparatus. As shown in FIG. 1, the vehicle 10 is provided with an engine 12 functioning as a drive force source configured to generate a drive force, drive wheels 14 and a drive-force transmitting apparatus 16 that is provided in drive-force transmitting paths between the engine 12 and the drive wheels 14.

The drive-force transmitting apparatus 16 includes a non-rotary member in the form of a casing 18, a fluid-operated type drive-force transmitting device in the form of a known torque converter 20 that is connected to the engine 12, an input shaft 22 connected to the torque converter 20, a continuously-variable transmission mechanism 24 connected to the input shaft 22, a forward/reverse switching device 26 connected to the input shaft 22, a gear mechanism 28 which is provided in parallel with the continuously-variable transmission mechanism 24 and which is connected to the input shaft 22 via the forward/reverse switching device 26, an output shaft 30 serving as an output rotary member that is common to the continuously-variable transmission mechanism 24 and the gear mechanism 28, a counter shaft 32, a reduction gear device 34 consisting of a pair of mutually meshing gears each of which is connected to a corresponding one of the output shaft 30 and the counter shaft 32 so as to unrotatable relative to the corresponding one of the shafts 30, 32, a gear 36 connected to the counter shaft 32 so as to be unrotatable relative to the counter shaft 32, and a differential gear device 38 connected to the gear 36. The torque converter 20, input shaft 22, continuously-variable transmission mechanism 24, forward/reverse switching device 26, gear mechanism 28, output shaft 30, counter shaft 32, reduction gear device 34, gear 36 and differential gear device 38 are disposed within the casing 18. The drive-force transmitting apparatus 16 further includes right and left axles 40 that are connected to the differential gear device 38. The input shaft 22 serves as an input rotary member to which the drive force of the engine 12 is to be inputted. The output shaft 30 serves as the output rotary member through which the drive force of the engine 12 is to be outputted. It is noted that the above-described drive force is synonymous with a drive torque or a drive power unless otherwise distinguished from them.

In the drive-force transmitting apparatus 16 constructed as described above, the drive force generated by the engine 12 is transmitted to the right and left drive wheels 14, via the torque converter 20, forward/reverse switching device 26, gear mechanism 28, reduction gear device 34, differential gear device 38, axles 40 and other elements, or alternatively, via the torque converter 20, continuously-variable transmission mechanism 24, reduction gear device 34, differential gear device 38, axles 40 and other elements.

As described above, the drive-force transmitting apparatus 16 has the gear mechanism 28 and the continuously-variable transmission mechanism 24 that are provided in parallel with each other in respective drive-force transmitting paths PT between the engine 12 and the drive wheels 14. Specifically, the drive-force transmitting apparatus 16 has the gear mechanism 28 and the continuously-variable transmission mechanism 24 that are provided in parallel with each other in the respective drive-force transmitting paths PT between the input shaft 22 and the output shaft 30. That is, the drive-force transmitting apparatus 16 defines the plurality of drive-force transmitting paths that are parallel with each other between the input shaft 22 and the output shaft 30, such that the drive force of the engine 12 is to be transmitted from the input shaft 22 to the output shaft 30 through a selected one of the drive-force transmitting paths PT. The plurality of drive-force transmitting paths PT consist of a first drive-force transmitting path PT1 constituted mainly by the gear mechanism 28 and a second drive-force transmitting path PT2 constituted mainly by the continuously-variable transmission mechanism 24. The first and second drive-force transmitting paths PT1, PT2 are defined in parallel with each other between the input shaft 22 and the output shaft 30. The first drive-force transmitting path PT1 is a path through which the drive force of the engine 12 is to be transmitted from the input shaft 22 toward the drive wheels 14 through the gear mechanism 28. The second drive-force transmitting path PT2 is a path through which the drive force of the engine 12 is to be transmitted from the input shaft 22 toward the drive wheels 14 through the continuously-variable transmission mechanism 24.

In the drive-force transmitting apparatus 16, the drive force of the engine 12 is transmitted toward the drive wheels 14 through a selected one of the first and second drive-force transmitting paths PT1, PT2, which is selected depending on a running state of the vehicle 10. To this end, the drive-force transmitting apparatus 16 includes a plurality of engagement devices by which the selected one of the first and second drive-force transmitting paths PT1, PT2 is established. The plurality of engagement devices include a first clutch C1, a first brake B1 and a second clutch C2. The first clutch C1, which serves as a first engagement device, is provided in the first drive-force transmitting path PT1 and configured to selectively connect and disconnect the first drive-force transmitting path PT1, such that the first drive-force transmitting path PT1 is established with engagement of the first clutch C1 during forward running of the vehicle 10. The first brake B1, which serves as an engagement device, is provided in the first drive-force transmitting path PT1 and configured to selectively connect and disconnect the first drive-force transmitting path PT1, such that the first drive-force transmitting path PT1 is established with engagement of the first brake B1 during reverse running of the vehicle 10. That is, the first drive-force transmitting path PT1 is established with either the first clutch C1 or the first brake B1 being engaged. The second clutch C2, which serves as a second engagement device, is disposed in the second drive-force transmitting path PT2 and configured to selectively connect and disconnect the second drive-force transmitting path PT2, such that the second drive-force transmitting path PT2 is established with engagement of the second clutch C2. That is, the second drive-force transmitting path PT2 is established with the second clutch C2 being engaged. Each of the first clutch C1, first brake B1 and second clutch C2 is a known hydraulically-operated wet-type frictional engagement device that is to be frictionally engaged by operation of a hydraulic actuator. As described below, each of the first clutch C1 and the first brake B1 constitutes a part of the forward/reverse switching device 26.

The engine 12 is provided with an engine control device 42 including an electronic throttle device, a fuel injection device, an ignition device and other devices that are required for controlling an output of the engine 12. In the engine 12, the engine control device 42 is controlled, by an electronic control apparatus 90 (that corresponds to a control apparatus recited in the appended claims), based on an operation amount θacc of an accelerator pedal that corresponds to a required drive force of the vehicle 10 required by an operator of the vehicle 10, whereby an engine torque Te of the engine 12 is controlled.

The torque converter 20 is provided with a pump impeller 20p and a turbine impeller 20t that are connected to the engine 12 and the input shaft 22, respectively. The drive-force transmitting apparatus 16 is provided with a mechanical oil pump 44 connected to the pump impeller 20p. The oil pump 44 is to be driven by the engine 12, to supply a working fluid pressure as its original pressure to a hydraulic control unit (hydraulic control circuit) 46 provided in the vehicle 10, for performing a shifting control operation in the continuously-variable transmission mechanism 24, generating a belt clamping force in the continuously-variable transmission mechanism 24, and switching an operation state of each of the above-described engagement devices between its engaged state and released state.

The forward/reverse switching device 26 includes a planetary gear device 26p of double-pinion type in addition to the first clutch C1 and the first brake B1. The planetary gear device 26p is a differential mechanism including three rotary elements consisting of an input element in the form of a carrier 26c, an output element in the form of a sun gear 26s and a reaction element in the form of a ring gear 26r. The carrier 26c is connected to the input shaft 22. The ring gear 26r is operatively connected to the casing 18 through the first brake B1. The sun gear 26s is connected to a small-diameter gear 48 that is provided to be coaxial with the input shaft 22 and rotatable relative to the input shaft 22. The carrier 26c and the sun gear 26s are operatively connected to each other through the first clutch C1.

The gear mechanism 28 includes, in addition to the above-described small-diameter gear 48, a gear-mechanism counter shaft 50 and a large-diameter gear 52 which meshes with the small-diameter gear 48 and which is provided to be coaxial with the gear-mechanism counter shaft 50 and unrotatable relative to the gear-mechanism counter shaft 50. The large-diameter gear 52 has a diameter larger than that of the small-diameter gear 48. The gear mechanism 28 further includes an idler gear 54 that is provided to be coaxial with the gear-mechanism counter shaft 50 and rotatable relative to the gear-mechanism counter shaft 50, and an output gear 56 that is provided to be coaxial with the output shaft 30 and unrotatable relative to the output shaft 30. The output gear 56 has a diameter larger than that of the idler gear 54. Therefore, the gear mechanism 28 provides a gear ratio between the input shaft 22 and the output shaft 30 in the first drive-force transmitting path PT1. That is, the gear mechanism 28 corresponds to a gear mechanism configured to provide at least one gear ratio. The gear mechanism 28 further includes a dog clutch D1 as an engagement device that is disposed on the gear-mechanism counter shaft 50 between the large-diameter gear 52 and the idler gear 54 so as to selectively connect and disconnect a drive-force transmitting path between the two gears 52, 54. The dog clutch D1 is configured to selectively connect and disconnect the first drive-force transmitting path PT1, such that the first drive-force transmitting path PT1 is established with engagement of the dog clutch D1. The dog clutch D1, which is also included in the above-described plurality of engagement devices, serves as an engagement device that cooperates with the first clutch C1 or the first brake B1 to establish the first drive-force transmitting path PT1. That is, the first drive-force transmitting path PT1 is established with both of the dog clutch D1 and the first clutch C1 or both of the dog clutch D1 and the first brake B1 being engaged. An operation state of the dog clutch D1 is switched by operation of a hydraulic actuator (not shown) that is included in the drive-force transmitting apparatus 16.

The first drive-force transmitting path PT1 is established with both of the dog clutch D1 and the first engagement device being engaged, namely, with both of engagement of the dog clutch D1 and engagement of either one of the first clutch C1 and the first brake B1 which cooperate with each other to constitute the first engagement device and which are located to be closer to the input shaft 22 than the dog clutch D1. When the first clutch C1 as well as the dog clutch D1 is engaged, the first drive-force transmitting path PT1 for forward running of the vehicle 10 is established. When the first brake B1 as well as the dog clutch D1 is engaged, the first drive-force transmitting path PT1 for reverse running of the vehicle 10 is established. In the drive-force transmitting apparatus 16, with the first drive-force transmitting path PT1 being established, the drive-force transmitting apparatus 16 is placed in its drive-force transmittable state in which the drive force of the engine 12 is transmittable from the input shaft 22 to the output shaft 30 through the gear mechanism 28. With the first drive-force transmitting path PT1 being cut off by release of both of the first clutch C1 and the first brake B1 or by release of the dog clutch D1, the drive-force transmitting apparatus 16 is placed in its neutral state in which the drive force is not transmittable.

Figure 2:
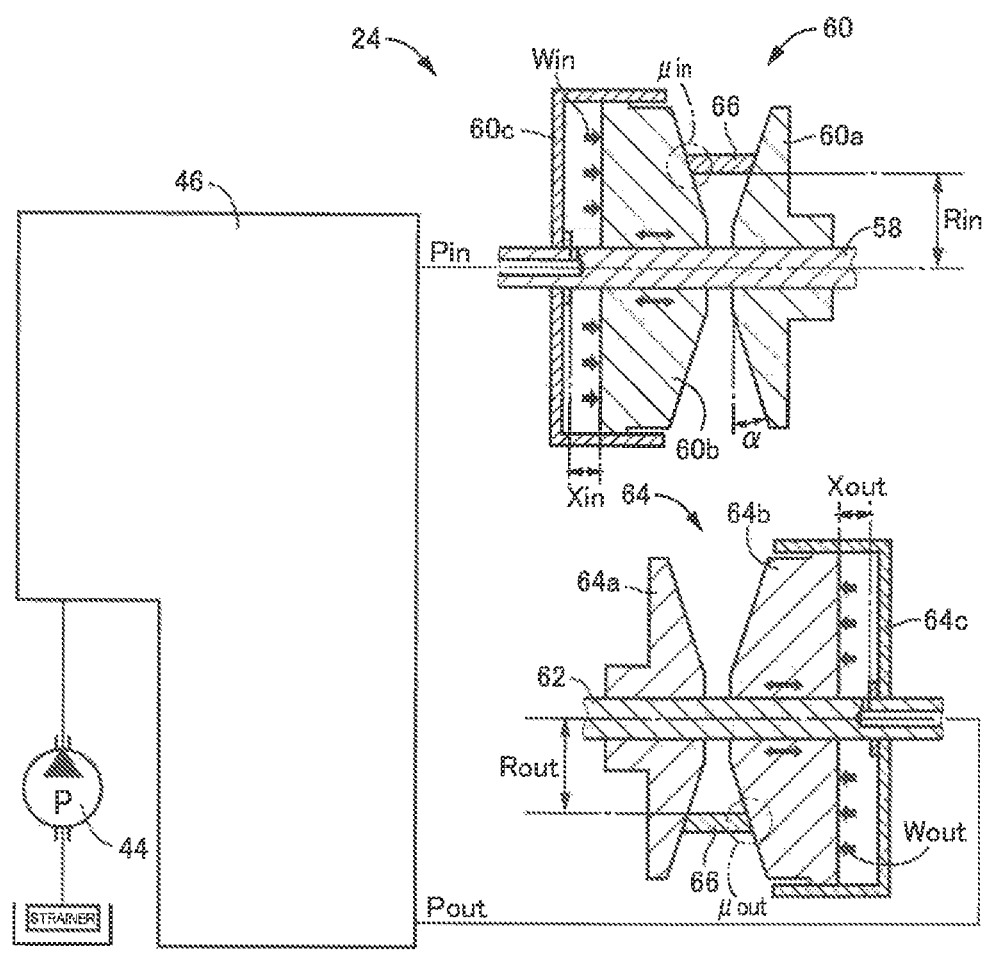
FIG. 2 is a view for explaining a construction of a continuously-variable transmission mechanism.

FIG. 2 is a view for explaining a construction of the continuously-variable transmission mechanism 24. As shown in FIGS. 1 and 2, the continuously-variable transmission mechanism 24 includes a primary shaft 58 provided to be coaxial with the input shaft 22 and connected integrally to the input shaft 22, a primary pulley 60 connected to the primary shaft 58 and having a variable effective diameter, a secondary shaft 62 provided to be coaxial with the output shaft 30, a secondary pulley 64 connected to the secondary shaft 62 and having a variable effective diameter, and a transfer element in the form of a transmission belt 66 looped over or mounted on the pulleys 60, 64. The continuously-variable transmission mechanism 24 is a known belt-type continuously-variable transmission in which the drive force is transmitted owing to a friction force generated between the transmission belt 66 and each of the pulleys 60, 64, and is configured to transmit the drive force of the engine 12 toward the drive wheels 14. The friction force is synonymous with a clamping force, and is referred also to as a belt clamping force. The belt clamping force corresponds to a belt torque capacity Tcvt that is a torque capacity of the transmission belt 66 in the continuously-variable transmission mechanism 24.

The primary pulley 60 includes a fixed sheave 60a connected to the primary shaft 58, a movable sheave 60b unrotatable about an axis of the primary shaft 58 and axially movable relative to the fixed sheave 60a, and a hydraulic actuator 60c configured to apply a primary thrust Win to the movable sheave 60b. The primary thrust Win is a thrust (=primary pressure Pin*pressure receiving area) for changing a width of a V-shaped groove defined between the fixed and movable sheaves 60a, 60b of the primary pulley 60. That is, the primary thrust Win is a thrust applied to the primary pulley 60 from the hydraulic actuator 60c, to clamp the transmission belt 66 that is mounted on the primary pulley 60. The primary pressure Pin is a hydraulic pressure supplied from the hydraulic control unit 46 to the hydraulic actuator 60c, and serves as a pulley hydraulic pressure for generating the primary thrust Win. Meanwhile, the secondary pulley 64 includes a fixed sheave 64a connected to the secondary shaft 62, a movable sheave 64b unrotatable about an axis of the secondary shaft 62 and axially movable relative to the fixed sheave 64a, and a secondary hydraulic actuator 64c configured to apply a secondary thrust Wout to the movable sheave 64b. The secondary thrust Wout is a thrust (=secondary pressure Pout*pressure receiving area) for changing a width of a V-shaped groove defined between the fixed and movable sheaves 64a, 64b of the secondary pulley 64. That is, the secondary thrust Wout is a thrust applied to the secondary pulley 64 from the secondary hydraulic actuator 64c, to clamp the transmission belt 66 that is mounted on the secondary pulley 64. The secondary pressure Pout is a hydraulic pressure supplied from the hydraulic control unit 46 to the secondary hydraulic actuator 64c, and serves as a pulley hydraulic pressure for generating the secondary thrust Wout.

In the continuously-variable transmission mechanism 24, the primary and secondary pressures Pin, Pout are controlled by the hydraulic control unit 46 that is controlled by the electronic control apparatus 90, whereby the primary and secondary thrusts Win, Wout are respectively controlled. With the primary and secondary thrusts Win, Wout being controlled, the widths of the V-shaped grooves of the respective pulleys 60, 64 are controlled to be changeable whereby a belt winding diameter (effective diameter) of each of the pulleys 60, 64 is changeable and accordingly a gear ratio γcvt (=primary rotational speed Npri/secondary rotational speed Nsec) of the continuously-variable transmission mechanism 24 is changeable. Further, with the primary and secondary thrusts Win, Wout being controlled, the belt clamping force is controlled such that slipping of the transmission belt 66 is not caused. That is, with the primary and secondary thrusts Win, Wout being controlled, the gear ratio γcvt of the continuously-variable transmission mechanism 24 is controlled to a target gear ratio γcvttgt while the transmission belt 66 is prevented from being slipped. It is noted that the primary rotational speed Npri represents a rotational speed of the primary shaft 58 and that the secondary rotational speed Nsec represents a rotational speed of the secondary shaft 62.

In the continuously-variable transmission mechanism 24, when the primary pressure Pin is increased, the width of the V-shaped groove of the primary pulley 60 is reduced whereby the gear ratio γcvt is reduced. The reduction of the gear ratio γcvt corresponds to a shift-up action performed in the continuously-variable transmission mechanism 24. In the continuously-variable transmission mechanism 24, the lowest gear ratio γmin is provided with the width of the V-shaped groove of the primary pulley 60 being minimized. Within a range of the gear ratio γcvt that can be provided by the continuously-variable transmission mechanism 24, the lowest gear ratio gear ratio γmin is a value of the gear ratio γcvt which makes it possible to maximize the running speed of the vehicle 10. Further, in the continuously-variable transmission mechanism 24, when the primary pressure Pin is reduced, the width of the V-shaped groove of the primary pulley 60 is increased whereby the gear ratio γcvt is increased. The increase of the gear ratio γcvt corresponds to a shift-down action performed in the continuously-variable transmission mechanism 24. In the continuously-variable transmission mechanism 24, the highest gear ratio γmax is provided with the width of the V-shaped groove of the primary pulley 60 being maximized. Within the range of the gear ratio γcvt that can be provided by the continuously-variable transmission mechanism 24, the highest gear ratio gear ratio γmax is a value of the gear ratio γcvt which makes it possible to minimize the running speed of the vehicle 10.

In the continuously-variable transmission mechanism 24, the belt slippage is prevented by the primary thrust Win and the secondary thrust Wout, and the target gear ratio γcvttgt is established by a combination of the primary thrust Win and the secondary thrust Wout, rather than by only one of the primary thrust Win and the secondary thrust Wout. As described below, the gear ratio γcvt of the continuously-variable transmission mechanism 24 is changed with change of a thrust ratio τ(=Wout/Win) which is a ratio of the secondary thrust Wout to the primary thrust Win and which is dependent on a relationship between the primary pressure Pin and the secondary pressure Pout. For example, the gear ratio γcvt is increased with increase of the thrust ratio τ, namely, a shift-down action of the continuously-variable transmission mechanism 24 is caused with increase of the thrust ratio τ.

The output shaft 30 is provided to be coaxial with the secondary shaft 62 and rotatable relative to the secondary shaft 62. The second clutch C2 is provided in a drive-force transmitting path (that corresponds to a part of the above-described second drive-force transmitting path PT2) between the secondary pulley 64 and the output shaft 30. The second drive-force transmitting path PT2 is established with engagement of the second clutch C2. In the drive-force transmitting apparatus 16, with the second drive-force transmitting path PT2 being established, the drive-force transmitting apparatus 16 is placed in its drive-force transmittable state in which the drive force of the engine 12 is transmittable from the input shaft 22 to the output shaft 30 through the continuously-variable transmission mechanism 24. With the second drive-force transmitting path PT2 being cut off by release of the second clutch C2, the drive-force transmitting apparatus 16 is placed in its neutral state in which the drive force is not transmittable. The gear ratio γcvt of the continuously-variable transmission mechanism 24 corresponds to a gear ratio established in the second drive-force transmitting path PT2.

In the drive-force transmitting apparatus 16, a gear ratio EL of the gear mechanism 28, which is a gear ratio ygear (=input-shaft rotational speed Nin/output-shaft rotational speed Nout) provided in the first drive-force transmitting path PT1, is higher than the above-described highest gear ratio γmax of the continuously-variable transmission mechanism 24 which is the highest gear ratio provided in the second drive-force transmitting path PT2. That is, the gear ratio EL is a value that makes it possible to reduce the running speed of the vehicle 10 more than the highest gear ratio γmax. The gear ratio EL of the gear mechanism 28 corresponds to a first-speed gear ratio γ1 in the drive-force transmitting apparatus 16. The highest gear ratio γmax of the continuously-variable transmission mechanism 24 corresponds to a second-speed gear ratio γ2 in the drive-force transmitting apparatus 16. Thus, any gear ratio provided in the second drive-force transmitting path PT2 is lower than the gear ratio provided in the first drive-force transmitting path PT1. It is noted that the input-shaft rotational speed Nin represents a rotational speed of the input shaft 22 and that the output-shaft rotational speed Nout represents a rotational speed of the output shaft 30.

The vehicle 10 can run in a selected one of the gear running mode and the belt running mode. The gear running mode is a running mode in which the vehicle 10 runs with the drive force being transmitted through the first drive-force transmitting path PT1 that is established in the drive-force transmitting apparatus 16. The belt running mode is a running mode in which the vehicle 10 runs with the drive force being transmitted through the second drive-force transmitting path PT2 that is established in the drive-force transmitting apparatus 16. When forward running of the vehicle 10 is to be made in the gear running mode, the first clutch C1 and the dog clutch D1 are engaged while the second clutch C2 and the first brake B1 are released. When reverse running of the vehicle 10 is to be made in the gear running mode, the first brake B1 and the dog clutch D1 are engaged while the second clutch C2 and the first clutch C1 are released. In the belt running mode, forward running of the vehicle 10 can be made.

The gear running mode is selected to be established when the vehicle 10 runs at a running speed within a relative low speed range or when the vehicle 10 is stopped. The belt running mode is selected to be established when the vehicle 10 runs at a running speed within a relatively high speed range including a middle speed range as well as a high speed range. When the belt running mode is established in the middle speed range, the dog clutch D1 is engaged. When the belt running mode is established in the high speed range, the dog clutch D1 is released, for example, for the purpose of avoiding drag of the gear mechanism 28 and other elements during running of the vehicle 10 in the belt running mode and preventing gears of the gear mechanism 28 and components (such as pinion gears) of the planetary gear device 26p from being rotated at high speeds.

The vehicle 10 is provided with the electronic control apparatus 90 as a controller including the control apparatus constructed according to present invention. For example, the electronic control apparatus 90 includes a so-called micro-computer incorporating a CPU, a ROM, a RAM and an input-output interface. The CPU performs control operations of the vehicle 10, by processing various input signals, according to control programs stored in the ROM, while utilizing a temporary data storage function of the RAM. The electronic control apparatus 90 is configured to perform, for example, an engine control operation for controlling an output of the engine 12, a shifting control operation and a belt-clamping-force control operation for the continuously-variable transmission mechanism 24, and a hydraulic-pressure control operation for switching the operation state of each of the plurality of engagement devices (C1, B1, C2, D1). The electronic control apparatus 90 may be constituted by two or more control units exclusively assigned to perform different control operations such as the engine control operation and the hydraulic-pressure control operation.

The electronic control apparatus 90 receives various input signals based on values detected by respective sensors provided in the vehicle 10. Specifically, the electronic control apparatus 90 receives: an output signal of an engine speed sensor 70 indicative of an engine rotational speed Ne which is a rotational speed of the engine 12; an output signal of a primary speed sensor 72 indicative of a primary rotational speed Npri which is a rotational speed of the primary shaft 58 which is equivalent to an input-shaft rotational speed Nin; an output signal of a secondary speed sensor 74 indicative of a secondary rotational speed Nsec which is a rotational speed of the secondary shaft 62; an output signal of an output speed sensor 76 indicative of an output-shaft rotational speed Nout which is a rotational speed of the output shaft 30 and which corresponds to the running speed V of the vehicle 10; an output signal of an accelerator-operation amount sensor 78 indicative of an accelerator operation amount θacc which represents an amount of accelerating operation made by a vehicle operator; an output signal of a throttle-opening degree sensor 80 indicative of the throttle opening degree tap; and an output signal of a shift position sensor 82 indicative of an operation position POSsh of a manually-operated shifting member in the form of a shift lever 84 provided in the vehicle 10. Further, the electronic control apparatus 90 generates various output signals which are supplied to various devices such as the engine control device 42 and the hydraulic control unit 46 and which include an engine-control command signal Se for controlling the engine 12, a hydraulic control command signal Scvt for performing hydraulic controls such as controls of the shifting action and the belt clamping force of the continuously-variable transmission mechanism 24, and a hydraulic-control command signal Scbd for performing hydraulic controls such as controls of operation states of the plurality of engagement devices. It is noted that the input-shaft rotational speed Nin (=primary rotational speed Npri) is equivalent to a rotational speed of the turbine impeller 20t of the of the torque converter 20. It is also noted that the primary rotational speed Npri is equivalent to a rotational speed of the primary pulley 60 and that the secondary rotational speed Nsec is equivalent to a rotational speed of the secondary pulley 64. Further, the electronic control apparatus 90 calculates an actual gear ratio γcvt (=Npri/Nsec) that is an actual value of the gear ratio γcvt of the continuously-variable transmission mechanism 24, based on the primary rotational speed Npri and the secondary rotational speed Nsec.

The shift lever 84 is operable to be placed in a selected one of a plurality of operation positions POSsh that consist of, for example, a parking position P, a reverse position R, a neutral position N and a drive position D. With the shift lever 84 being placed in the parking position P, the drive-force transmitting apparatus 16 is placed in its parking position in which the drive-force transmitting apparatus 16 is placed in its neutral state and rotation of the output shaft 30 is mechanically inhibited (locked). The drive-force transmitting apparatus 16 is placed in the neutral state, for example, by releasing all of the first clutch C1, first brake B1 and second clutch C2. That is, the neutral state is a state of the drive-force transmitting apparatus 16 in which neither the first drive-force transmitting path PT1 nor the second drive-force transmitting path PT2 is established. With the shift lever 84 being placed in the reverse position R, the drive-force transmitting apparatus 16 is placed in its reverse drive position for enabling the reverse running of the vehicle 10 in the gear running mode. With the shift lever 84 being placed in the neutral position N, the drive-force transmitting apparatus 16 is placed in its neutral position in which the drive-force transmitting apparatus 16 is placed in its neutral state. With the shift lever 84 being placed in the drive position D, the drive-force transmitting apparatus 16 is placed in its forward drive position for enabling the forward running of the vehicle 10 in the gear running mode, or enabling the forward running of the vehicle 10 in the belt running mode with execution of an automatic shifting control of the continuously-variable transmission mechanism 24.

For performing various control operations in the vehicle 10, the electronic control apparatus 90 includes an engine control means or portion in the form of an engine control portion 92, a transmission shifting control means or portion in the form of a transmission shifting control portion 94 and a state determining means or portion in the form of a state determining portion 96.

The engine control portion 92 calculates a target drive force Fwtgt, for example, by applying the accelerator operation amount θacc and the running velocity V to a predetermined or stored relationship (e.g., drive force map) that is obtained by experimentation or determined by an appropriate design theory. The engine control portion 92 sets a target engine torque Tetgt that ensures the target drive force Fwtgt, and outputs the engine-control command signal Se for controlling the engine 12 so as to obtain the target engine torque Tetgt. The outputted engine-control command signal Se is supplied to the engine control device 42.

When the operation position POSsh of the shift lever 84 is the parking position P or the neutral position N during stop of the vehicle 10, the transmission shifting control portion 94 supplies, to the hydraulic control unit 46, the hydraulic-control command signal Scbd requesting engagement of the dog clutch D1, in preparation of transition to the gear running mode. When the operation position POSsh is switched from the parking position P or the neutral position N to the drive position D during stop of the vehicle 10, the transmission shifting control portion 94 supplies, to the hydraulic control unit 46, the hydraulic-control command signal Scbd requesting engagement of the first clutch C1, whereby the gear running mode is established to enable forward running of the vehicle 10. When the operation position POSsh is switched from the parking position P or the neutral position N to the reverse position R during stop of the vehicle 10, the transmission shifting control portion 94 supplies, to the hydraulic control unit 46, the hydraulic-control command signal Scbd requesting engagement of the first brake B1, whereby the gear running mode is established to enable reverse running of the vehicle 10.

When the operation position POSsh is the drive position D, the transmission shifting control portion 94 executes a switching control operation for switching the running mode between the gear running mode and the belt running mode. Specifically, the transmission shifting control portion 94 determines whether shifting from one of first and second speed positions to the other is to be executed or not, by applying the running speed V and the accelerator operation amount θacc to a stepped shifting map in which shift-up lines, shift-down lines and hysteresis between each of the shift-up lines and a corresponding one of the shift-down lines are defined. The first speed position corresponds to the above-described gear ratio EL provided in the gear mechanism 28 by which the drive force is to be transmitted through the first drive-force transmitting path PT1 during the gear running mode. The second speed position corresponds to the above-described highest gear ratio γmax that is the highest one of the gear ratios (or that is a maximum value within a given range of a continuously-variable gear ratio) provided in the continuously-variable transmission mechanism 24 by which the drive force is to be transmitted through the second drive-force transmitting path PT2 during the belt running mode. Then, when determining that the shifting is to be executed, the transmission shifting control portion 94 switches the running mode from one of the gear running mode and the belt running mode to the other, so as to execute shifting up or down from one of the first and second speed positions to the other.

When determining that the running mode is to be switched from the gear running mode to the belt running mode so as to execute the shifting up from the first speed position to the second speed position during running in the gear running mode, the transmission shifting control portion 94 supplies, to the hydraulic control unit 46, the hydraulic-control command signal Scbd requesting releasing and engaging actions of the respective first and second clutches C1, C2, so as to perform a so-called "clutch to clutch" shifting operation. As a result of the shifting up from the first speed position to the second speed position, the second drive-force transmitting path PT2 is established in place of the first drive-force transmitting path PT1 in the drive-force transmitting apparatus 16. Thus, the transmission shifting control portion 94 executes a stepped shifting control to release and engage the first and second clutches C1, C2, respectively, so as to cause the drive-force transmitting apparatus 16 to execute the shift-up action by which the selected running mode (i.e., selected state) is switched from the gear running mode (i.e., first state) in which the first drive-force transmitting path PT1 is established to the belt running mode (i.e., second state) in which the second drive-force transmitting path PT2 is established. In the following description relating to the present embodiment, the shift-up action, which is executed by the drive-force transmitting apparatus 16 to switch the selected running mode from the gear running mode to the belt running mode, will be referred to as "stepped shift-up action".

When determining that the running mode is to be switched from the belt running mode to the gear running mode so as to execute the shifting down from the second speed position to the first speed position during running in the belt running mode, the transmission shifting control portion 94 supplies, to the hydraulic control unit 46, the hydraulic-control command signal Scbd requesting releasing and engaging actions of the respective second and first clutches C2, C1, so as to perform the clutch to clutch shifting operation. As a result of the shifting down from the second speed position to the first speed position, the first drive-force transmitting path PT1 is established in place of the second drive-force transmitting path PT2 in the drive-force transmitting apparatus 16. Thus, the transmission shifting control portion 94 executes a stepped shifting control to engage and release the first and second clutches C1, C2, respectively, so as to cause the drive-force transmitting apparatus 16 to execute the shift-down action by which the selected running mode is switched from the belt running mode in which the second drive-force transmitting path PT2 is established to the gear running mode in which the first drive-force transmitting path PT1 is established. In the following description relating to the present embodiment, the shift-down action, which is executed by the drive-force transmitting apparatus 16 to switch the selected running mode from the belt running mode to the gear running mode, will be referred to as "stepped shift-down action".

In the switching control operation for switching the running mode between the gear running mode and the belt running mode, the switching between the first and second drive-force transmitting paths PT1, PT2 is made by only the above-described clutch to clutch shifting operation for making a torque transfer via an transition state in which the dog clutch D1 is engaged in the belt running mode in the middle speed range, so that the switching control operation is performed with a shifting shock being restrained.

For executing a shifting action in the continuously-variable transmission mechanism 24 during the belt running mode, the transmission shifting control portion 94 supplies, to the hydraulic control unit 46, the hydraulic-control command signal Scvt for controlling the primary pressure Pin and the secondary pressure Pout such that the target gear ratio γcvttgt is established in the continuously-variable transmission mechanism 24 while the belt slippage is not caused in the continuously-variable transmission mechanism 24. This hydraulic-control command signal Scvt includes a primary-pressure command signal Spin requesting the primary pressure Pin to become a target primary pressure Pintgt and a secondary-pressure command signal Spout requesting the secondary pressure Pout to become a target secondary pressure Pouttgt.

The target primary pressure Pintgt is a target pulley hydraulic-pressure by which a primary target thrust Wintgt that is a target value of the primary thrust Win applied to the primary pulley 60 is generated. The target secondary pressure Pouttgt is a target pulley hydraulic-pressure by which a secondary target thrust Wouttgt that is a target value of the secondary thrust Wout applied to the secondary pulley 64 is generated. In calculation of each of the primary target thrust Wintgt and the secondary target thrust Wouttgt, a required thrust, which is minimally required to prevent the belt slippage on a corresponding one of the primary and secondary pulleys 60, 64, is taken into consideration. This required thrust is a belt-slip limit thrust Wlmt that is a thrust value shortly before occurrence of the belt slippage in the continuously-variable transmission mechanism 24. In the following description relating to the present invention, the belt-slip limit thrust Wlmt will be referred to as "slip limit thrust Wlmt".

Specifically, the transmission shifting control portion 94 calculates each of the primary target thrust Wintgt and the secondary target thrust Wouttgt. The transmission shifting control portion 94 compares the secondary thrust Wout, which is calculated based on a primary-side slip limit thrust Winlmt that is the slip limit thrust Wlmt minimally required to prevent slippage of the transmission belt 66 on the primary pulley 60, with a secondary-side slip limit thrust Woutlmt that is the slip limit thrust Wlmt minimally required to prevent slippage of the transmission belt 66 on the secondary pulley 64, and then selects a larger one of the secondary thrust Wout and the secondary-side slip limit thrust Woutlmt. The secondary thrust Wout, which is calculated based on the primary-side slip limit thrust Winlmt, is a secondary-side shifting-control thrust Woutsh that is required to be applied to the second pulley 64 in a shifting control, as described below.

The transmission shifting control portion 94 sets, as the primary target thrust Wintgt, the primary thrust Win calculated based on the secondary target thrust Wouttgt. The primary thrust Win, which is calculated based on the secondary target thrust Wouttgt, is a primary-side shifting-control thrust Winsh that is required to be applied to the primary pulley 60 in a shifting control, as described below. Further, as described below, the transmission shifting control portion 94 compensates the primary-side shifting-control thrust Winsh, namely, compensates the primary target thrust Wintgt, by a feedback control of the primary thrust Win that is executed based on a gear ratio deviation Δγcvt (=γcvttgt−γcvt) that is a deviation of the actual gear ratio γcvt from the target gear ratio γcvttgt.

In the above-described compensation of the primary-side shifting-control thrust Winsh, a deviation of an actual value from a target value in each parameter that has a one-to-one correspondence relationship with the gear ratio γcvt may be used in place of the gear ratio deviation Δγcvt. For example, in the compensation of the primary-side shifting-control thrust Winsh, it is possible to use a deviation ΔXin (=Xintgt−Xin) of an actual position Xin of the movable sheave 60b from a target position Xintgt of the movable sheave 60b in the primary pulley 60 (see FIG. 2), a deviation ΔXout (=Xoutgt−Xout) of an actual position Xout of the movable sheave 64b from a target position Xintgt of the movable sheave 64b in the secondary pulley 64 (see FIG. 2), a deviation ΔRin (=Rintgt−Rin) of an actual belt-winding diameter (actual effective diameter) Rin from a target belt-winding diameter (target effective diameter) Rintgt in the primary pulley 60 (see FIG. 2), a deviation ΔRout (=Routtgt−Rout) of an actual belt-winding diameter (actual effective diameter) Rout from a target belt-winding diameter (target effective diameter) Routtgt in the secondary pulley 64 (see FIG. 2), and a deviation ΔNpri (=Npritgt−Npri) of an actual primary rotational speed Npri from a target primary rotational speed Npritgt.

Each of the above-described primary-side shifting-control thrust Winsh and secondary-side shifting-control thrust Woutsh is a thrust required to be applied to a corresponding one of the primary and secondary pulleys 60, 64 in a shifting control to execute a desired shifting action to establish the target gear ratio γcvttgt at a target shifting speed dγtgt (that is a target value of a shifting speed dγ). The shifting speed dγ is a rate (=dγcvt/dt) of change of the gear ratio γcvt, namely, an amount (=dγcvt/dt) of change of the gear ratio γcvt per a unit of time. In the present embodiment, the shifting speed dγ is defined as an amount (=dX/dNelm) of pulley displacement per an element of the transmission belt 66, wherein "dX" represents an amount of displacement of the pulley in an axial direction of the pulley per a unit of time, and "dNelm" represents a number of elements (of the transmission belt 66) that are caused to bite into the pulley (i.e., caused to enter the V-shaped groove of the pulley) per the unit of time. The shifting speed dγ is represented by a primary shifting speed dγ in (=dXin/dNelmin) and a secondary shifting speed dγ out (=d Xout/dNelmout).

The thrust, which is applied to each of the pulleys 60, 64 in a steady state in which the gear ratio γcvt is constant, is referred to as "balance thrust Wbl" that is referred also to as "steady thrust". The thrust ratio τ is represented as a ratio (=Woutbl/Winbl) of a secondary balance thrust Woutbl to a primary balance thrust Winbl, wherein the secondary balance thrust Woutbl is the balance thrust Wbl of the secondary pulley 64 and the primary balance thrust Winbl is the balance thrust Wbl of the primary pulley 60. On the other hand, in the steady state, if one of the thrusts applied to the respective pulleys 60, 64 is increased or reduced by a certain amount, the steady state is lost whereby the gear ratio γcvt is changed thereby generating the shifting speed dγ that corresponds to the certain amount by which the one of the thrusts is increased or reduced. The certain amount, by which the thrust is increased or reduced, will be referred to as "gear-ratio changing thrust ΔW" that is referred also to as "transient thrust". Where the gear ratio γcvt is changed to the target gear ratio γcvttgt by changing the thrust applied to the primary pulley 60, the gear-ratio changing thrust ΔW is represented by a primary gear-ratio changing thrust ΔWin that corresponds to an amount by which the thrust applied to the primary pulley 60 is increased or reduced. Where the gear ratio γcvt is changed to the target gear ratio γcvttgt by changing the thrust applied to the secondary pulley 64, the gear-ratio changing thrust ΔW is represented by a secondary gear-ratio changing thrust ΔWout that corresponds to an amount by which the thrust applied to the secondary pulley 64 is increased or reduced.

Where one of the primary-side shifting-control thrust Winsh and secondary-side shifting-control thrust Woutsh, which are thrusts required to be applied to the respective primary and secondary pulleys 60, 64 in a shifting control, has been set, the other of the primary-side shifting-control thrust Winsh and secondary-side shifting-control thrust Woutsh is set to a sum of the balance thrust Wbl and the gear-ratio changing thrust ΔW, wherein the balance thrust Wbl is dependent on the above-described one of the primary-side shifting-control thrust Winsh and secondary-side shifting-control thrust Woutsh and the thrust ratio τ corresponding to the target gear ratio γcvttgt, and the gear-ratio changing thrust ΔW corresponds to the target shifting speed dγtgt of change of the target gear ratio γcvttgt. The target shifting speed dγtgt is represented by a primary target shifting speed dγintgt and a secondary target shifting speed dγouttgt. The primary gear-ratio changing thrust ΔWin is a positive value (ΔWin>0) that is larger than zero in a shift-up state in which the gear ratio γcvt is to be reduced, and is a negative value (ΔWin<0) that is smaller than zero in a shift-down state in which the gear ratio γcvt is to be increased. The primary gear-ratio changing thrust ΔWin is zero (ΔWin=0) in a steady state in which the gear ratio γcvt is constant. Further, the secondary gear-ratio changing thrust ΔWout is a negative value (ΔWout<0) that is smaller than zero in the shift-up state, and is a positive value (ΔWout>0) that is larger than zero in the shift-down state. The secondary gear-ratio changing thrust ΔWout is zero (ΔWout=0) in the steady state.

Figure 3:
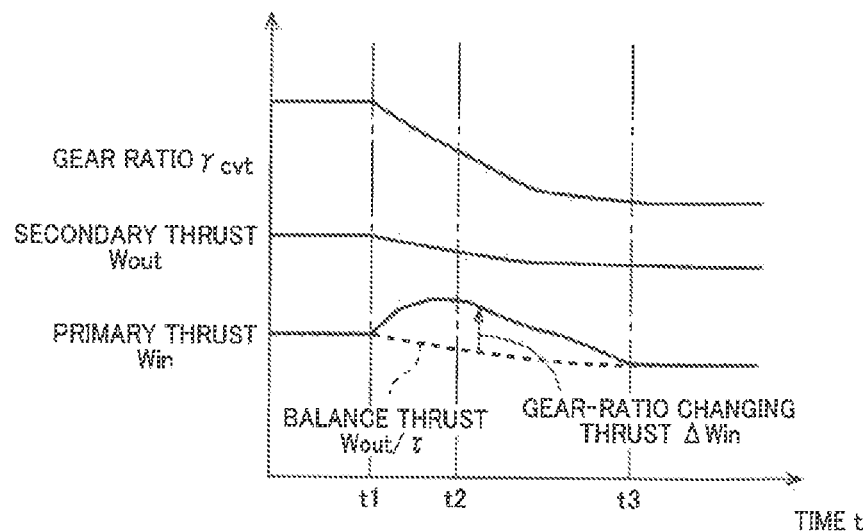
FIG. 3 is a view showing an example for explaining thrusts required for a shifting control.
Figure 4:
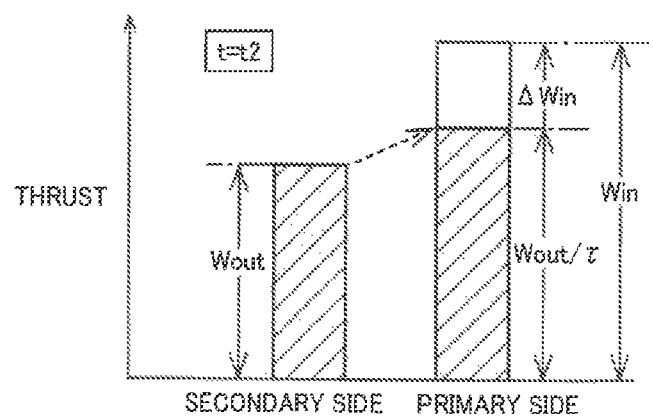
FIG. 4 is a view showing, by way of example, a relationship between the thrusts at a point t2 of time shown in FIG. 3.

FIG. 3 is a view showing an example for explaining thrusts required for a shifting control. FIG. 4 is a view showing, by way of example, a relationship between the thrusts at a point t2 of time shown in FIG. 3. FIGS. 3 and 4 show, by a way of example, the primary thrust Win that is set in a case where a desired shift-up action is executed by increasing the primary thrust Win while setting the secondary thrust Wout to prevent a belt slippage on the secondary pulley 64. As shown in FIG. 3, at a stage until a point t1 of time and a stage from a point t3 of time, namely, in the steady state in which the target gear ratio γcvttgt is constant with the primary gear-ratio changing thrust ΔWin is zero, the primary thrust Win consists of only the primary balance thrust Winbl (=Wout/τ). At a stage from the point t1 of time until the point t3 of time, namely, in the shift-up state in which the target gear ratio γcvttgt is reduced, the primary thrust Win corresponds to a sum of the primary balance thrust Winbl and the primary gear-ratio changing thrust ΔWin, as shown in FIG. 4. In FIG. 4, a hatched portion of each of the primary and secondary thrusts Win, Wout corresponds to a corresponding one of the primary and secondary balance thrusts Winbl, Woutbl that are required at the point t2 of time shown in FIG. 3 to maintain the target gear ratio γcvttgt.

Figure 5:
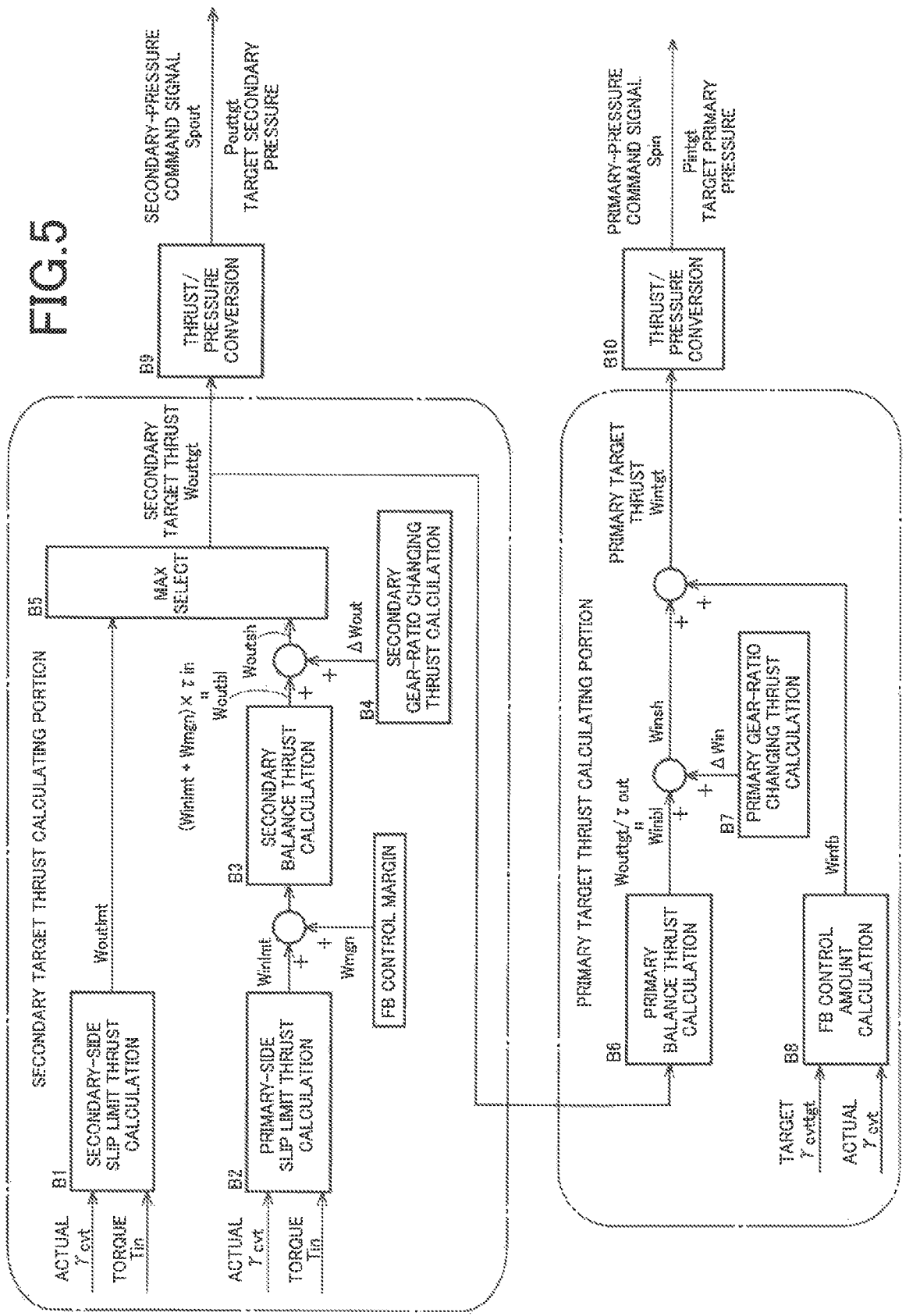
FIG. 5 is a block diagram showing an arrangement for controls performed to prevent a belt slippage and establish a target gear ratio, with minimally required thrusts.

FIG. 5 is a block diagram showing an arrangement for controls performed to prevent a belt slippage and establish a target gear ratio, with minimally required thrusts, for explaining a hydraulic control, i.e., a CVT hydraulic control executed in the continuously-variable transmission mechanism 24.

FIG. 5 is a block diagram showing an arrangement for controls performed to prevent a belt slippage and execute a desired shifting action, with minimally required thrusts. In FIG. 5, the transmission shifting control portion 94 calculates the target gear ratio γcvttgt. Specifically, the transmission shifting control portion 94 calculates the target primary rotational speed Npritgt by applying the accelerator operation amount θacc and the vehicle running speed V into a predetermined relationship in the form of a CVT shifting map. Then, the transmission shifting control portion 94 calculates, based on the target primary rotational speed Npritgt, a post-shifting target gear ratio γcvttgtl (=Npritgt/Nsec) that is the gear ratio γcvt to be established after the shifting action executed in the continuously-variable transmission mechanism 24. In order that the shifting action is executed rapidly and smoothly, the transmission shifting control portion 94 determines the target gear ratio γcvttgt as a transient target value of the gear ratio γcvt in process of the shifting action, based on a pre-shifting gear ratio γcvt (i.e., gear ratio γcvt before the shifting action) and the post-shifting target gear ratio γcvttgtl, according to a relationship predetermined to cause the shifting action to be executed rapidly and smoothly. For example, the transmission shifting control portion 94 determines the target gear ratio γcvttgt (that is to be changed in process of the shifting action) as a function that is changed, along a curved line whose inclination is smoothly changed, toward the post-shifting target gear ratio γcvttgtl, with lapse of time from initiation of the shifting action. This smoothly curved line is, for example, a first-order lag curve or a second-order lag curve. When determining the target gear ratio γcvttgt, the shifting control portion 94 calculates the target shifting speed dγtgt, based on the target gear ratio γcvttgt as the time function. When the target gear ratio γcvttgt becomes constant upon completion of the shifting action, namely, when the continuously-variable transmission mechanism 24 is brought back into the steady state, the shifting speed dγtgt becomes zero.

The transmission-shifting control portion 94 calculates a belt-portion input torque Tb as an input torque inputted to the continuously-variable transmission mechanism 24, which is used for calculation of the thrust ratio τ, and also a slip-limit-thrust calculation torque Tin which is used for calculation of the slip limit thrust Wlmt.

Specifically, the transmission-shifting control portion 94 calculates an estimated value of the engine torque Te, for example, by applying the throttle opening degree tap and the engine rotational speed Ne to a predetermined relationship such as an engine torque map. The transmission-shifting control portion 94 calculates a turbine torque Tt, based on the estimated value of the engine torque Te and a predetermined relationship such as characteristic of the torque converter 20. The calculated turbine torque Ti is an estimated value of the input torque inputted to the continuously-variable transmission mechanism 24. The transmission-shifting control portion 94 handles the turbine torque Tt as the belt-portion input torque Tb.

Basically, the belt-portion input torque Tb may be handled as the slip-limit-thrust calculation torque Tin. However, in view of variation or the like, it is not preferable that the slip limit thrust Wlmt is regarded as zero when the belt-portion input torque Tb is zero. Therefore, as the slip-limit-thrust calculation torque Tin, a torque value, which is obtained through a lower-limit guard processing applied to the belt-portion input torque Tb, is used. The transmission-shifting control portion 94 selects, as the slip-limit-thrust calculation torque Tin, a larger one of an absolute value of the belt-portion input torque Tb and a lower limit torque Tinlim. The lower limit torque Tinlim is a positive value that is predetermined for increasing the slip-limit-thrust calculation torque Tin so as to more reliably prevent a belt slippage in view of a variation. It is noted that, when the belt-portion input torque Tb is a negative vale, a torque value dependent on the belt-portion input torque Tb may be used as the slip-limit-thrust calculation torque Tin, in view of a low torque accuracy (i.e., low accuracy of an obtained value of each torque). This torque value dependent on the belt-portion input torque Tb is, for example, a positive value that is larger than an absolute value of the belt-portion input torque Tb. Thus, the slip-limit-thrust calculation torque Tin is a torque value that is based on the input torque inputted to the continuously-variable transmission mechanism 24, namely, based on the belt-portion input torque Tb.

At each of blocks B1 and B2 shown in FIG. 5, the transmission-shifting control portion 94 calculates the slip limit thrust Wlmt, based on the actual gear ratio γcvt and the slip-limit-thrust calculation torque Tin. Specifically, the transmission-shifting control portion 94 calculates the secondary-side slip limit thrust Woutlmt, by using an equation (1) given below, and calculates the primary-side slip limit thrust Winlmt, by using an equation (2) given below. In the equations (1) and (2), "Tin" represents the slip-limit-thrust calculation torque Tin; "Tout" represents a torque (=γcvt*Tin=(Rout/Rin)*Tin) corresponding to the slip-limit-thrust calculation torque Tin converted onto the secondary pulley 64; "α" represents a sheave angle of each of the pulleys 60, 64 (see FIG. 2), "μin" represents an element/pulley friction coefficient in the primary pulley 60 (i.e., coefficient of friction acting between the transmission belt 66 and the primary pulley 60), "μout" represents an element/pulley friction coefficient in the secondary pulley 64 (i.e., coefficient of friction acting between the transmission belt 66 and the secondary pulley 64), "Rin" represents ½ of the belt winding diameter (effective diameter) of the primary pulley 60, which is uniquely calculated based on the actual gear ratio γcvt (see FIG. 2), and "Rout" represents ½ of the belt winding diameter (effective diameter) of the secondary pulley 64, which is uniquely calculated based on the actual gear ratio γcvt (see FIG. 2).

$$Woutlmt = (Tout * \cos\alpha) / (2 * \mu out * Rout) \quad (1)$$
$$= (Tin * \cos\alpha) / (2 * \mu out * Rin)$$
$$Winlmt = (Tin * \cos\alpha) / (2 * \mu in * Rin) \quad (2)$$

As the slip limit thrust Wlmt, a value obtained through a lower-limit guard processing applied to the calculated slip limit thrust Wlmt is used. The transmission-shifting control portion 94 selects, as the primary-side slip limit thrust Winlmt to be used at block B3 shown in FIG. 5, a larger one of the primary-side slip limit thrust Winlmt (that is calculated in the above equation (2)) and a primary-side minimum thrust Winmin. The primary-side minimum thrust Winmin is a hard limit minimum thrust which is to be applied to the primary pulley 60 and which includes a ΔPin-corresponding thrust value. The ΔPin-corresponding thrust value is a value of thrust (=ΔPin*pressure receiving area) that is to be generated by a primary-pressure variation ΔPin. The primary-pressure variation ΔPin is a control variation amount of the primary pressure Pin, which could be supplied from the hydraulic control unit 46 into the hydraulic actuator 60c even when the primary-pressure command signal Spin requesting the primary pressure Pin to be zero. The secondary-side slip limit thrust Woutlmt is also subjected to a lower-limit guard processing. It is noted that such a control variation amount of the primary pressure Pin does not have to be taken into account, if the hydraulic control unit 46 or other unit is provided with a hydraulic-pressure sensor detecting the secondary pressure Pout so as to control the secondary pressure Pout by a feedback control executed based on a difference between an actual value of the secondary pressure Pout and a detected value of the secondary pressure Pout that is detected by the hydraulic-pressure sensor.

At each of blocks B3 and B6 shown in FIG. 5, the transmission shifting control portion 94 calculates the balance thrust Wbl. That is, the transmission shifting control portion 94 calculates the secondary balance thrust Woutbl based on the primary-side lower-limit thrust Winlmt, and calculates the primary balance thrust Winbl based on the secondary target thrust Wouttgt.

Figure 6:
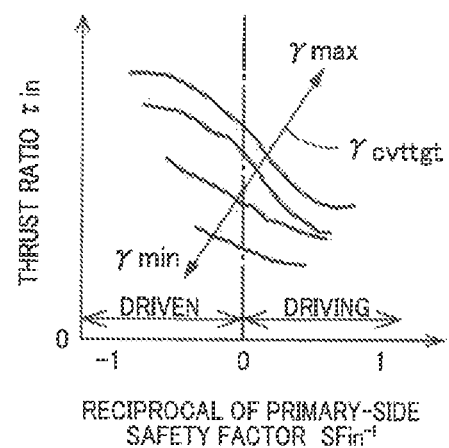
FIG. 6 is a view showing, by way of example, a thrust ratio map for calculating a secondary-thrust calculation thrust ratio value of a thrust ratio, which is used to calculate the thrust to be applied to a secondary pulley.
Figure 7:
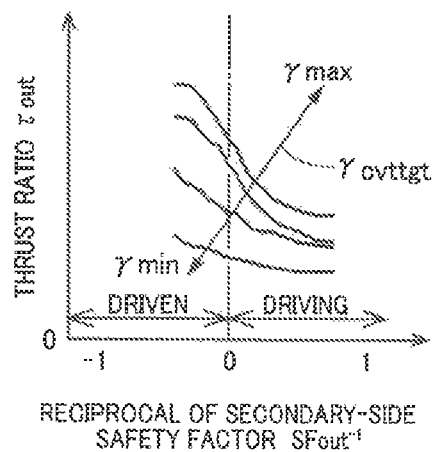
FIG. 7 is a view showing, by way of example, a thrust ratio map for calculating a primary-thrust calculation thrust ratio value of the thrust ratio, which is used to calculate the thrust to be applied to a primary pulley.

Specifically, the transmission-shifting control portion 94 calculates a thrust ratio τin that corresponds to or establishes the target gear ratio γcvttgt, for example, by applying the target gear ratio γcvttgt and a reciprocal SFin$^{-1}$ of a primary-side safety factor SFin to a thrust ratio map (τin) shown in FIG. 6. The thrust ratio map (τin) is a predetermined relationship between the reciprocal SFin$^{-1}$ of the primary-side safety factor SFin and the thrust ratio τin, with a parameter in the form of the target gear ratio γcvttgt. The thrust ratio τin is a thrust ratio (secondary-thrust calculation thrust ratio value) that is used to calculate the thrust applied to the secondary pulley 64, based on the thrust applied to the primary pulley 60. The transmission-shifting control portion 94 calculates the secondary balance thrust Woutbl based on the primary-side slip limit thrust Winlmt and the thrust ratio τin, by using equation (3) given below. The primary-side safety factor SFin is, for example, "Win/Winlmt" or "Tin/Tb", and the reciprocal SFin$^{-1}$ of the primary-side safety factor SFin is, for example, "Winlmt/Win" or "Tb/Tin". Further, the transmission-shifting control portion 94 calculates a thrust ratio τout that corresponds to or establishes the target gear ratio γcvttgt, for example, by applying the target gear ratio γcvttgt and a reciprocal SFout$^{-1}$ (=Woutlmt/Wout) of a secondary-side safety factor SFout to a thrust ratio map (τout) shown in FIG. 7. The thrust ratio map (τout) is a predetermined relationship between the reciprocal SFout$^{-1}$ of the secondary-side safety factor SFout and the thrust ratio τout, with a parameter in the form of the target gear ratio γcvttgt. The thrust ratio τout is a thrust ratio (primary-thrust calculation thrust ratio value) that is used to calculate the thrust applied to the primary pulley 60, based on the thrust applied to the secondary pulley 64. The transmission-shifting control portion 94 calculates the primary balance thrust Winbl based on the secondary target thrust Wouttgt and the thrust ratio τout, by using equation (4) given below. The secondary-side safety factor SFout is, for example, "Wout/Woutlmt" or "Tin/Tb", and the reciprocal SFout$^{-1}$ of the secondary-side safety factor SFout is, for example, "Woutlmt/Win" or "Tb/Tin". Since the slip-limit-thrust calculation torque Tin is always a positive value, when the vehicle 10 is in a driving state (i.e., a state in which the vehicle 10 drives itself) in which the belt-portion input torque Tb is a positive value, a driving-state range of the thrust ratio τ is used, because each of the reciprocals SFin$^{-1}$, SFout$^{-1}$ of the respective safety factors SFin, SFout is also a positive value when the vehicle 10 is in the driving state. On the other hand, when the vehicle 10 is in a driven state in which the belt-portion input torque Tb is a negative value, a driven-state range of the thrust ratio τ is used, because each of the reciprocals SFin$^{-1}$, SFout$^{-1}$ of the respective safety factors SFin, SFout is also a negative value when the vehicle 10 is in the driven state. Each of the reciprocals SFin$^{-1}$, SFout$^{-1}$ may be calculated each time when the balance thrust Wbl is to be calculated. Or alternatively, where each of the safety factors SFin, SFout is set to a predetermined value (e.g., about 1.0-1.5), each of the reciprocals SFin$^{-1}$, SFout$^{-1}$ may be reciprocals of such safety factor that is set to the predetermined value.

$$Woutbl = Winlmt * \tau in \quad (3)$$

$$Winbl = Wouttgt / \tau out \quad (4)$$

As described above, each of the slip limit thrusts Winlmt, Woutlmt is calculated based on the slip-limit-thrust calculation torque Tin that is based on the belt-portion input torque Tb. The reciprocals SFin$^{-1}$, SFout$^{-1}$ of the respective safety factors SFin, SFout, based on which the thrust ratios τin, τout are calculated, are values based on the belt-portion input torque Tb. Thus, the transmission-shifting control portion 94 calculates the thrust ratio τ that establishes the target gear ratio γcvttgt of the continuously-variable transmission mechanism 24, based on the belt-portion input torque Tb.

At each of blocks B4 and B7, the transmission shifting control portion 94 calculates the gear-ratio changing thrust ΔW. That is, the transmission shifting control portion 94 calculates the secondary gear-ratio changing thrust ΔWout and the primary gear-ratio changing thrust ΔWin.

Figure 8:
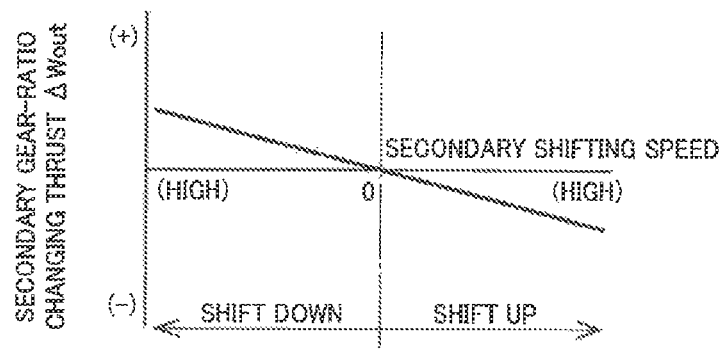
FIG. 8 is a view showing, by way of example, a gear-ratio-changing thrust map for calculating a secondary gear-ratio changing thrust.
Figure 9:
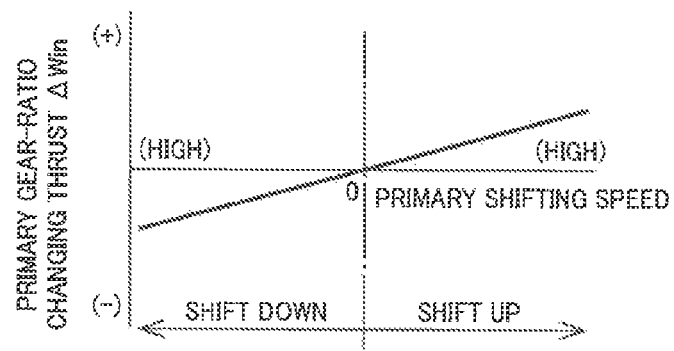
FIG. 9 is a view showing, by way of example, a gear-ratio-changing thrust map for calculating a primary gear-ratio changing thrust.

Specifically, the transmission shifting control portion 94 calculates the secondary gear-ratio changing thrust ΔWout, for example, by applying the secondary target shifting speed dγouttgt to a gear-ratio-changing thrust map (ΔWout) shown in FIG. 8. The gear-ratio-changing thrust map (ΔWout) represents, by way of example, a predetermined relationship between the secondary shifting speed dγ out and the secondary gear-ratio changing thrust ΔWout. The transmission shifting control portion 94 calculates, as the secondary thrust required to prevent a belt slippage on the primary pulley 60, a secondary-side shifting-control thrust Woutsh (=Woutbl+ΔWout), by adding the secondary gear-ratio changing thrust ΔWout to the secondary balance thrust Woutbl. Further, the transmission shifting control portion 94 calculates the primary gear-ratio changing thrust ΔWin, for example, by applying the primary target shifting speed dγintgt to a gear-ratio-changing thrust map (ΔWin) shown in FIG. 9. The gear-ratio-changing thrust map (ΔWin) represents, by way of example, a predetermined relationship between the primary shifting speed dγ in and the primary gear-ratio changing thrust ΔWin. The transmission shifting control portion 94 calculates a primary-side shifting-control thrust Winsh (=Winbl+ΔWin), by adding the primary gear-ratio changing thrust ΔWin to the primary balance thrust Winbl.

In calculations made at the above-described blocks B3 and B4, a predetermined physical characteristic diagram such as the thrust ratio map (τin) shown in FIG. 6 and the gear-ratio-changing thrust map (ΔWout) shown in FIG. 8 is used. Therefore, in a result of calculation of each of the secondary balance thrust Woutbl and the secondary gear-ratio changing thrust ΔWout, there exists a variation that is dependent on an individual difference of a hard unit such as the hydraulic control unit 46 in terms of physical characteristics. Where such a variation in terms of the physical characteristics is taken into consideration, the transmission-shifting control portion 94 may add a control margin Wmgn to the primary-side slip limit thrust Winlmt. The control margin Wmgn is a predetermined thrust that corresponds to the variation in terms of the physical characteristics which could affect the calculation of each of the secondary balance thrust Woutbl and the secondary gear-ratio changing thrust ΔWout. Where the variation in terms of the physical characteristics is taken into consideration, the transmission-shifting control portion 94 calculates the secondary balance thrust Woutbl by using an equation "Woutbl=(Winlmt+Wmgn)*τin" shown in FIG. 5 in place of the above-described equation (3). It is noted that the calculation could be affected by the variation in terms of the physical characteristics as well as the variation in term of an actual value of the pulley hydraulic-pressure that is generated in response to the hydraulic-control command signal Scvt, and that the calculation could be affected by the variation in terms of the physical characteristics by a degree, which could be relatively large depending on a kind of hard unit (such as the hydraulic control unit 46) having the individual difference. However, in general, the degree by which the calculation could be affected by the variation in the physical characteristics is extremely small as compared with a degree by which the calculation could be affected by the variation in the actual value of the pulley hydraulic-pressure.

At block B5 shown in FIG. 5, the transmission shifting control portion 94 selects, as the secondary target thrust Wouttgt, a larger one of the secondary-side slip limit thrust Woutlmt and the secondary-side shifting-control thrust Woutsh.

At block B8 shown in FIG. 5, the transmission shifting control portion 94 calculates a feedback control amount Winfb. Specifically, the transmission shifting control portion 94 calculates a feedback control amount (=FB control amount) Winfb that makes the actual gear ratio γcvt coincident with the target gear ratio γcvttgt, by using a feedback-control formula in the form of equation (5) given below. In the equation (5), "Δγcvt" represents the gear ratio deviation Δγcvt, "Kp" represents a predetermined proportionality constant, "Ki" represents a predetermined integral constant, and "Kd" represents a predetermined differential constant. The transmission shifting control portion 94 calculates, as the primary target thrust Wintgt, an amended value (=Winsh+Winfb) of the feedback control amount Winfb that is amended by a feedback control, by adding the feedback control amount Winfb to the primary-side shifting-control thrust Winsh.

$$W_{infb} = K_p * \Delta\gamma_{cvt} + K_i * (\int \Delta\gamma_{cvt} dt) + K_d * (d\Delta\gamma_{cvt}/dt) \quad (5)$$

At each of blocks B9 and B10 shown in FIG. 5, the transmission shifting control portion 94 converts the target thrust into a target pulley pressure. Specifically, the transmission shifting control portion 94 converts the primary target thrust Wintgt into a target primary pressure Pintgt (=Wintgt/pressure receiving area), based on the pressure receiving area of the primary hydraulic actuator 60c, and converts the secondary target thrust Wouttgt into a target secondary pressure Pouttgt (=Wouttgt/pressure receiving area), based on the pressure receiving area of the secondary hydraulic actuator 64c. The transmission shifting control portion 94 sets the primary-pressure command signal Spin representing the target primary pressure Pintgt and the secondary-pressure command signal Spout representing the target secondary pressure Pouttgt.

The transmission shifting control portion 94 supplies the hydraulic-control command signal Scvt in the form of the primary-pressure command signal Spin and the secondary-pressure command signal Spout, to the hydraulic control unit 46, for thereby obtaining the target primary pressure Pintgt and the target secondary pressure Pouttgt. The hydraulic control unit 46 regulates the primary pressure Pin and the secondary pressure Pout, in accordance with the supplied hydraulic-control command signal Scvt.

In the present embodiment, the primary pulley 60 is provided with a structure that mechanically stops movement of the movable sheave 60b in a direction away from the fixed sheave 60a, i.e., in a direction that increases the width of the V-shaped groove of the primary pulley 60. In the continuously-variable transmission mechanism 24, when the movable sheave 60b is positioned in a mechanical-end position in which the movement of the movable sheave 60b in the direction away from the fixed sheave 60a is mechanically stopped, the width of the V-shaped groove is maximized whereby the highest gear ratio γmax is established. When the gear ratio γcvt of the continuously-variable transmission mechanism 24 is the highest gear ratio γmax with the movable sheave 60b being inhibited from being further moved in the direction that increases the width of the V-shaped groove of the primary pulley 60, the belt torque capacity Tcvt is assured to prevent a belt slippage, even if the target primary pressure Pintgt for establishing the highest gear ratio γmaxtgt is reduced.

Therefore, in view of a thrust ratio error Δτ, when the gear ratio γcvt of the continuously-variable transmission mechanism 24 is the highest gear ratio γmax with the movable sheave 60b is positioned in the mechanical-end position, it is possible to set the thrust ratio τout to a value that reduces the primary thrust Win, for reliably maintaining the highest gear ratio γmax. The thrust ratio error Δτ corresponds to a possible amount of variation of the thrust ratio τ that is a predetermined value. In the following descriptions, the thrust ratio τout, which is used to calculate the primary thrust (i.e., thrust applied to the primary pulley 60) based on the secondary thrust (i.e., thrust applied to the secondary pulley 64), will be referred to as "primary-thrust calculation thrust ratio value τout", while the thrust ratio τout, which is for establishing the target gear ratio γcvttgt and which is calculated based on the belt-portion input torque Tb, will be referred to as "base thrust ratio τout0", so that the primary-thrust calculation thrust ratio value τout and the base thrust ratio τout0 are distinguished from each other. Further, the thrust ratio τin, which is used to calculate the secondary thrust (i.e., thrust applied to the secondary pulley 64) based on the primary thrust (i.e., thrust applied to the primary pulley 60), will be referred to as "secondary-thrust calculation thrust ratio value τin", while the thrust ratio τin, which is for establishing the target gear ratio γcvttgt and which is calculated based on the belt-portion input torque Tb, will be referred to as "base thrust ratio τin0", so that the secondary-thrust calculation thrust ratio value τin and the base thrust ratio τin0 are distinguished from each other. Further, the thrust ratio τ, which is for establishing the target gear ratio γcvttgt, will be referred to as "base thrust ratio τ0".

Setting the primary-thrust calculation thrust ratio value τout to a value that reduces the primary thrust Win corresponds to setting the primary-thrust calculation thrust ratio value τout to a value (=τout0+Δτ) which is a sum of the base thrust ratio τout0 and the thrust ratio error Δτ and which facilitates execution of a shift-down action of the continuously-variable transmission mechanism 24 more than the base thrust ratio τout0. The setting the primary-thrust calculation thrust ratio value τout to the value which facilitates execution of a shift-down action of the continuously-variable transmission mechanism 24 more than the base thrust ratio τout0 corresponds to setting the primary-thrust calculation thrust ratio value τout to a value that increases a difference between the primary thrust Win and the secondary thrust Wout more than the base thrust ratio τout0. Setting the secondary-thrust calculation thrust ratio value τin to a value that increases the secondary thrust Wout corresponds to setting the secondary-thrust calculation thrust ratio value τin to a value (=τin0+Δτ) which is a sum of the base thrust ratio τin0 and the thrust ratio error Δτ and which facilitates execution of a shift-down action of the continuously-variable transmission mechanism 24 more than the base thrust ratio τin0. The setting the secondary-thrust calculation thrust ratio value τin to the value which facilitates execution of a shift-down action of the continuously-variable transmission mechanism 24 more than the base thrust ratio τin0 corresponds to setting the secondary-thrust calculation thrust ratio value τin to a value that increases the difference between the primary thrust Win and the secondary thrust Wout more than the base thrust ratio τin0.

Where a known electromagnetic-pickup-type sensor is used as each of the rotational speed sensors 70, 72, 74, 76, for example, there is a possibility that a sufficient accuracy of detected value of the rotational speed detected by each of the speed sensors 70, 72, 74, 76 is not assured due to characteristics of each of the speed sensors 70, 72, 74, 76, when an actual rotational speed is in a low rotational-speed region that is very close to zero. When the accuracy of detection of the rotational speeds, which are to be used for calculation of the actual gear ratio γcvt of the continuously-variable transmission mechanism 24, is not assured, it would not be possible to satisfactorily execute the feedback control for making the actual gear ratio γcvt (=Npri/Nsec) coincident with the target gear ratio γcvttgt, by calculating the primary target thrust Wintgt that is a compensated value of the primary thrust Win calculated based on the secondary target thrust Wouttgt. As described above, when the gear ratio γcvt of the continuously-variable transmission mechanism 24 is the highest gear ratio γmax, it is possible to assure the belt torque capacity Tcvt preventing a belt slippage, even if the target primary pressure Pintgt is reduced from a pressure value for establishing the highest gear ratio γmaxtgt to a smaller pressure value. In the following descriptions relating to the present embodiment, the rotational speeds, which are used for calculation of the actual gear ratio γcvt of the continuously-variable transmission mechanism 24, will be referred to as "actual-gear-ratio-calculation rotational speeds". In the present embodiment, the actual-gear-ratio-calculation rotational speeds, whose detection accuracy is an issue, are the primary rotational speed Npri and/or the secondary rotational speed Nsec.

Thus, when the gear ratio γcvt of the continuously-variable transmission mechanism 24 is the highest gear ratio γmax without the detection accuracy of the actual-gear-ratio-calculation rotational speeds being assured, the transmission-shifting control portion 94 calculates the primary target thrust Wintgt, by subtracting the ΔPin-corresponding thrust value from the primary thrust Win, which is calculated based on the secondary target thrust Wouttgt with the thrust ratio error Δτ being taken into account, so that the highest gear ratio γmax can be reliably maintained even in the state in which the feedback control cannot be satisfactorily executed for making the actual gear ratio γcvt coincident with the target gear ratio γcvttgt.

Figure 15:
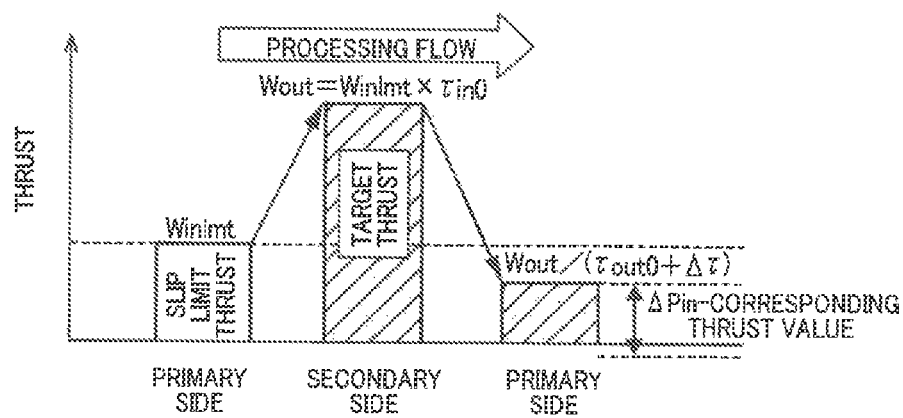
FIG. 15 is a view showing, by way of a comparative example, a flow of processing in which the secondary target thrust is calculated based on the primary-side slip limit thrust in the steady state in which the gear ratio is kept at the highest gear ratio.

When the belt-portion input torque Tb is low, since the secondary target thrust Wouttgt is made small, the primary thrust Win, which is calculated based on the secondary target thrust Wouttgt with the thrust ratio error Δτ being taken into consideration, is also made small, so that the calculated primary thrust Win could be smaller than the ΔPin-corresponding thrust value. That is, there could be no room for the reduction of the primary thrust Win by the ΔPin-corresponding thrust value, so that the highest gear ratio γmax could not be maintained. FIG. 15 is a view showing, by way of a comparative example, a flow of processing in which the secondary target thrust Wouttgt is calculated based on the primary-side slip limit thrust Winlmt in the steady state in which the gear ratio γcvt is kept at the highest gear ratio γmax. As shown in FIG. 15, in the steady state, the secondary target thrust Wouttgt (=Winlmt*τin0) is calculated based the primary-side slip limit thrust Winlmt and the base thrust ratio τin0 that is for establishing the target gear ratio γcvttgt. Further, in the steady state, the thrust ratio error Δτ is taken into consideration so that the primary thrust Win (=Wouttgt/(τout0+Δτ)) is calculated based on the secondary target thrust Wouttgt and a thrust ratio (=τout0+Δτ) that is a higher ratio value higher than the base thrust ratio τout0. Moreover, when the gear ratio γcvt of the continuously-variable transmission mechanism 24 is the highest gear ratio γmax and the feedback control cannot be satisfactorily executed to make the actual gear ratio γcvt equal to the target gear ratio γcvttgt, the thrust ratio error Δτ is taken into consideration so that the primary target thrust Wintgt is calculated to be a thrust value that is obtained by subtracting the ΔPin-corresponding thrust value from the primary thrust Win calculated based on the secondary target thrust Wouttgt. However, in the comparative example shown in FIG. 15 in which the primary thrust Win is smaller than the ΔPin-corresponding thrust value, the primary thrust Win cannot be reduced by the ΔPin-corresponding thrust value, so that the gear ratio γcvt of the continuously-variable transmission mechanism 24 could not be kept in the highest gear ratio γmax. It might be possible to set the secondary-thrust calculation thrust ratio value τin to a higher ratio value (=τin0+Δτ) that increases the secondary target thrust Wouttgt to a larger thrust value (=Winlmt*(τin0+Δτ)), so that the primary thrust Win, which is calculated based on the increased secondary target thrust Wouttgt, is also increased thereby making it possible to reduce the primary thrust Win by the ΔPin-corresponding thrust value. However, the increase of the secondary target thrust Wouttgt could result in undesirable reduction of the fuel economy.

In the present embodiment, when it is determined that the accuracy of the detection of the actual-gear-ratio-calculation rotational speeds is not assured, the transmission-shifting control portion 94 is configured to set each of the secondary-thrust calculation thrust ratio value τin and the primary-thrust calculation thrust ratio value τout, by using the base thrust ratio τ0 in the form of a corresponding one of a base thrust ratio τin0 and a base thrust ratio τout0, such that each of the set secondary-thrust calculation thrust ratio value τin and the set primary-thrust calculation thrust ratio value τout is dependent on a result of the determination as to whether the actual value of the gear ratio γcvt is the highest gear ratio γmax or not and a result of the determination as to whether the belt-portion input torque Tb is lower than the given torque value (Tbf) or not.

The electronic control apparatus 90 further includes a detection-accuracy determining means or portion in the form of a detection-accuracy determining portion 96, a highest-gear-ratio determining means or portion in the form of a highest-gear-ratio determining portion 98 and an input-torque determining means or portion in the form of an input-torque determining portion 99, for realizing control function to suitably establishing the secondary-thrust calculation thrust ratio value τin and the primary-thrust calculation thrust ratio value τout.

The detection-accuracy determining portion 96 makes a determination as to whether the detection accuracy of the actual-gear-ratio-calculation rotational speeds is assured not, namely, determines whether the detection accuracy of the actual-gear-ratio-calculation rotational speeds is insufficient or not. This determination is made by seeing if at least one of the primary and secondary rotational speeds Npri, Nsec detected by the respective rotational speed sensors 72, 74 is lower than a predetermined minimum speed value Nf or not. That is, the detection-accuracy determining portion 96 determines that the detection accuracy of the actual-gear-ratio-calculation rotational speeds is insufficient, when at least one of the primary and secondary rotational speeds Npri, Nsec is lower than the minimum speed value Nf. This minimum speed value Nf is a lower limit speed value of a predetermined speed range within which a corresponding one of the actual rotational speeds can be accurately detected by a corresponding one of the rotational speed sensors 72, 74 owing to characteristics of the speed sensor. It is noted that the minimum speed value Nf of the primary rotational speed Npri to be detected by the rotational speed sensor 72 and the minimum speed value Nf of the secondary rotational speed Nsec to be detected by the rotational speed sensor 74 may be either the same or different from each other.

The highest-gear-ratio determining portion 98 determines whether the actual gear ratio γcvt of the continuously-variable transmission mechanism 24 is the highest gear ratio γmax or not. For example, when it is determined by the detection-accuracy determining portion 96 that the detection accuracy of the actual-gear-ratio-calculation rotational speeds is not assured, the highest-gear-ratio determining portion 98 makes the determination as to whether the actual gear ratio γcvt is the highest gear ratio γmax or not, depending on whether the actual gear ratio γcvt has already become the highest gear ratio γmax before it is determined that the detection accuracy of the actual-gear-ratio-calculation rotational speeds is not assured. The state in which the actual gear ratio γcvt is the highest gear ratio γmax corresponds to a so-called "belt returned state" in which the transmission belt 66 is in a returned position that establishes the highest gear ratio γmax of the continuously-variable transmission mechanism 24. In this sense, the determination as to whether the actual gear ratio γcvt is the highest gear ratio γmax or not corresponds to a determination as to whether the belt returned state is established or not.

The input-torque determining portion 99 makes a determination as to whether the belt-portion input torque Tb is higher or equal to a given torque value Tbf. This given torque value Tbf is a lower limit value of a predetermined range of the belt-portion input torque Tb in which the ΔPin-corresponding thrust value can be subtracted from the primary thrust Win (=Wout/(τout0+Δτ)) that is calculated based on the secondary thrust Wout by taking account of, for example, the thrust ratio error Δτ. This predetermined range of the belt-portion input torque Tb corresponds to a positive value range of the belt-portion input torque Tb in which the vehicle 10 is in the driving state.

Figure 10:
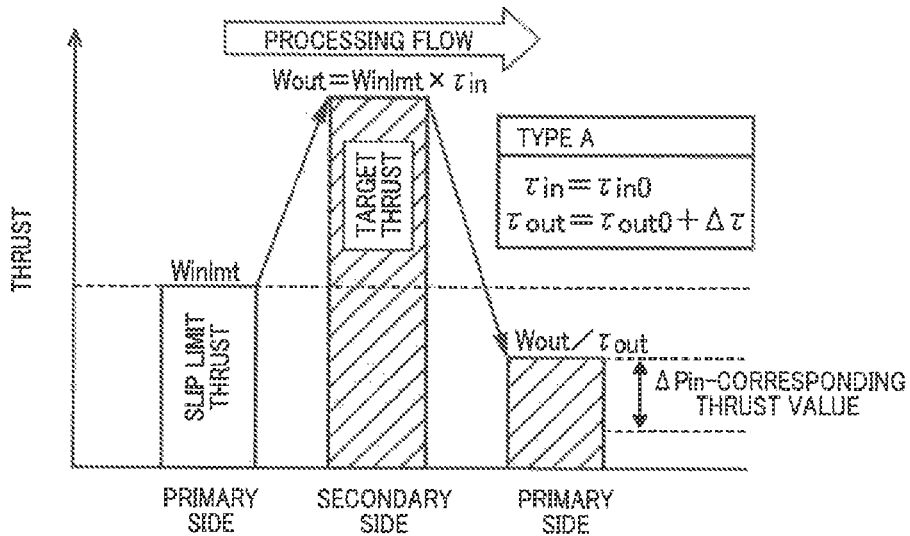
FIG. 10 is a view showing, in type A as an example according to an embodiment of the present invention, a flow of processing in which a secondary target thrust is calculated based on a primary-side slip limit thrust in a steady state in which a gear ratio of the continuously-variable transmission mechanism is kept at a highest gear ratio.

When it is determined by the detection-accuracy determining portion 96 that the detection accuracy of the actual-gear-ratio-calculation rotational speeds is not assured, namely, that the detection accuracy of the actual-gear-ratio-calculation rotational speeds is insufficient, if it is determined by the highest-gear-ratio determining portion 98 that the actual gear ratio γcvt is the highest gear ratio γmax and determined by the input-torque determining portion 99 that the belt-portion input torque Tb is equal to or higher than the given torque value Tbf, the transmission-shifting control portion 94 sets the secondary-thrust calculation thrust ratio value τin to the base thrust ratio (i.e., target-gear-ratio establishing ratio value) τin0 and sets the primary-thrust calculation thrust ratio value τout to a higher ratio value (τout0+Δτ) that is higher than the base thrust ratio τout0, as shown in FIG. 10. Thus, when it is determined that the actual gear ratio γcvt is the highest gear ratio γmax, the primary-thrust calculation thrust ratio value τout is set to the higher ratio value (τout0+Δτ) taking account of the thrust ratio error Δτ, for enabling the highest gear ratio γmax to be reliably maintained. Further, when the belt-portion input torque Tb is high, since the secondary target thrust Wouttgt is made sufficiently large, the primary thrust Win, which is calculated based on the secondary target thrust Wouttgt with the thrust ratio error Δτ being taken into consideration, is given a room for reduction by the ΔPin-corresponding thrust value (see FIG. 10). Therefore, when the belt-portion input torque Tb is not lower than the given torque value Tbf, it is not necessary to set the secondary-thrust calculation thrust ratio value τin to a higher ratio value (τin0+Δτ) that is higher than the base thrust ratio τin0, for increasing the secondary target thrust Wouttgt.

FIG. 10 is a view showing, in type A as an example according to the present embodiment, a flow of processing in which the secondary target thrust Wouttgt is calculated based on the primary-side slip limit thrust Winlmt in the steady state in which the gear ratio γcvt is kept at the highest gear ratio γmax. In this type A, a so-called "shifting followability" is improved by a shift-down assurance for the continuously-variable transmission mechanism 24, which takes account of the thrust ratio error Δτ. Further, the fuel economy is improved by avoiding an unnecessary increase of the secondary thrust Wout.

Figure 11:
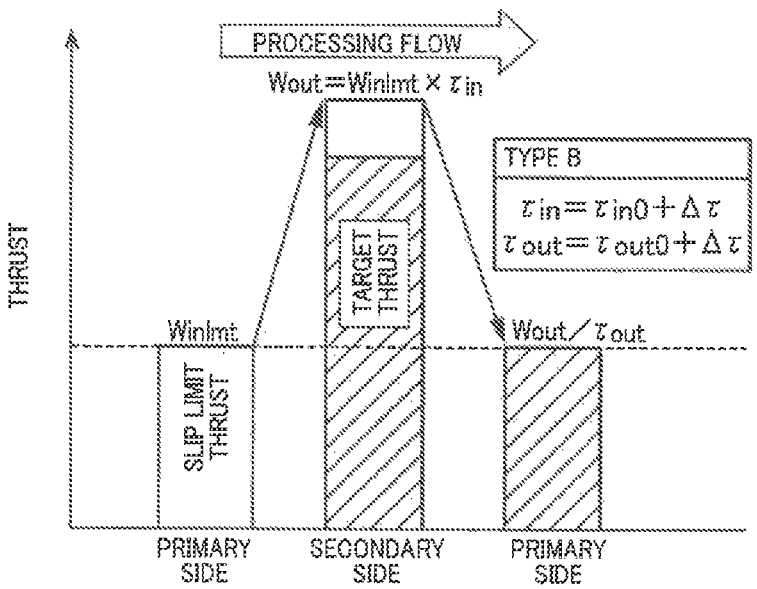
FIG. 11 is a view showing, in type B as an example according to the embodiment of the present invention, a flow of processing in which the secondary target thrust is calculated based on the primary-side slip limit thrust in the steady state in which the gear ratio of the continuously-variable transmission mechanism is kept at the highest gear ratio.

When it is determined by the detection-accuracy determining portion 96 that the detection accuracy of the actual-gear-ratio-calculation rotational speeds is not assured, if it is determined by the highest-gear-ratio determining portion 98 that the actual gear ratio γcvt is the highest gear ratio γmax and determined by the input-torque determining portion 99 that the belt-portion input torque Tb is lower than the given torque value Tbf, the transmission-shifting control portion 94 sets the secondary-thrust calculation thrust ratio value τin to the higher ratio value (τin0+Δτ) that is higher than the base thrust ratio τin0, and sets the primary-thrust calculation thrust ratio value τout to the higher ratio value (τout0+Δτ) that is higher than the base thrust ratio τout0, as shown in FIG. 11. Thus, when it is determined that the actual gear ratio γcvt is the highest gear ratio γmax, the primary-thrust calculation thrust ratio value τout is set to the higher ratio value (τout0+Δτ) taking account of the thrust ratio error Δτ, for enabling the highest gear ratio γmax to be reliably maintained. Further, when the belt-portion input torque Tb is low, the primary thrust Win, which is calculated based on the secondary target thrust Wouttgt with the thrust ratio error Δτ being taken into consideration, is not likely to be given a room for reduction by the ΔPin-corresponding thrust value. Therefore, when the belt-portion input torque Tb is lower than the given torque value Tbf, the secondary-thrust calculation thrust ratio value τin is set to the higher ratio value (τin0+Δτ) that is higher than the base thrust ratio τin0, so as to make the secondary target thrust Wouttgt larger.

FIG. 11 is a view showing, in type B as an example according to the present embodiment, a flow of processing in which the secondary target thrust Wouttgt is calculated based on the primary-side slip limit thrust Winlmt in the steady state in which the gear ratio γcvt is kept at the highest gear ratio γmax. In this type B, the shifting followability is improved by the shift-down assurance for the continuously-variable transmission mechanism 24, which takes account of the thrust ratio error Δτ.

Figure 12:
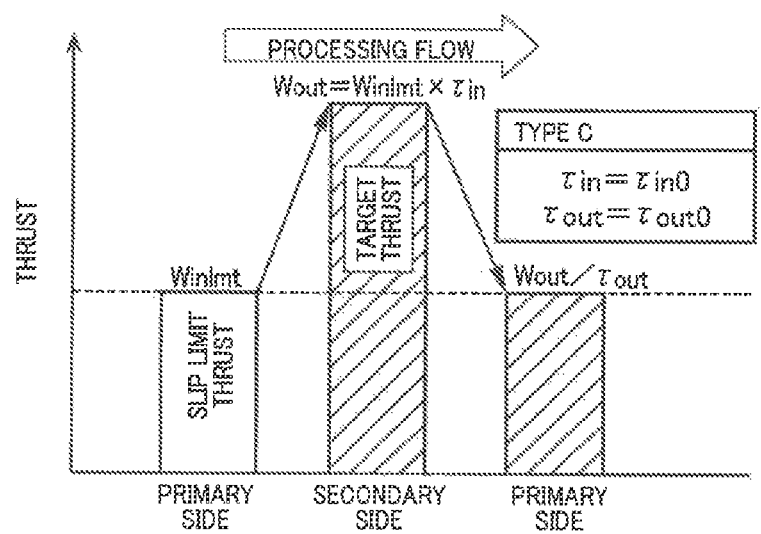
FIG. 12 is a view showing, in type C as an example according to the embodiment of the present invention, a flow of processing in which the secondary target thrust is calculated based on the primary-side slip limit thrust in the steady state.

When it is determined by the detection-accuracy determining portion 96 that the detection accuracy of the actual-gear-ratio-calculation rotational speeds is not assured, if it is determined by the highest-gear-ratio determining portion 98 that the actual gear ratio γcvt is not the highest gear ratio γmax, determined by the transmission-shifting control portion 94 that the target gear ratio γcvttgt is the highest gear ratio γmax and determined by the input-torque determining portion 99 that the belt-portion input torque Tb is not lower than the given torque value Tbf, the transmission-shifting control portion 94 sets the he secondary-thrust calculation thrust ratio value τin to the base thrust ratio τin0, and sets the primary-thrust calculation thrust ratio value τout to the base thrust ratio τout0, as shown in FIG. 12. When the actual gear ratio γcvt is not the highest gear ratio γmax, the movable sheave 60b is not mechanically inhibited from being moved in the direction that increases the width of the V-shaped groove of the primary pulley 60, so that the primary thrust Win has to be equal to or larger than the primary-side slip limit thrust Winlmt, for preventing a belt slippage. Further, in the positive value range of the belt-portion input torque Tb in which the vehicle 10 is in the driving state, an accuracy of an obtained value of the belt-portion input torque Tb is increased with increase of the belt-portion input torque Tb, and the change of the thrust ratio τout relative to the change of the belt-portion input torque Tb is made small (see FIG. 7). Therefore, although the target gear ratio γcvttgt is the highest gear ratio γmax, the primary-thrust calculation thrust ratio value τout is not set to the higher ratio value (τout0+Δτ) taking account of the thrust ratio error Δτ. Further, since the primary-thrust calculation thrust ratio value τout is not set to the higher ratio value (τout0+Δτ) that reduces the primary thrust Win, it is not necessary to set the secondary-thrust calculation thrust ratio value τin to the higher ratio value (τin0+Δτ) that increases the secondary target thrust Wouttgt.

FIG. 12 is a view showing, in type C as an example according to the present embodiment, a flow of processing in which the secondary target thrust Wouttgt is calculated based on the primary-side slip limit thrust Winlmt in the steady state. In this type C, the fuel economy is improved by avoiding an unnecessary increase of the secondary thrust Wout.

When it is determined by the detection-accuracy determining portion 96 that the detection accuracy of the actual-gear-ratio-calculation rotational speeds is not assured, if it is determined by the highest-gear-ratio determining portion 98 that the actual gear ratio γcvt is not the highest gear ratio γmax, determined by the transmission-shifting control portion 94 that the target gear ratio γcvttgt is the highest gear ratio γmax and determined by the input-torque determining portion 99 that the belt-portion input torque Tb is lower than the given torque value Tbf, the transmission-shifting control portion 94 sets the secondary-thrust calculation thrust ratio value τin to the higher ratio value (τin0+Δτ) that is higher than the base thrust ratio τin0, and sets the primary-thrust calculation thrust ratio value τout to the higher ratio value (τout0+Δτ) that is higher than the base thrust ratio τout0, as shown in FIG. 11. The accuracy of the obtained value of the belt-portion input torque Tb is reduced with reduction of the belt-portion input torque Tb, and the change of the thrust ratio τout relative to the change of the belt-portion input torque Tb is made large (see FIG. 7). Therefore, although the target gear ratio γcvttgt is not the highest gear ratio γmax, the primary-thrust calculation thrust ratio value τout is set to the higher ratio value (τout0+Δτ) taking account of the thrust ratio error Δτ, for facilitating the highest gear ratio γmax as the target gear ratio γcvttgt to be established. Further, since the actual gear ratio γcvt is not the highest gear ratio γmax, the primary thrust Win has to be equal to or larger than the primary-side slip limit thrust Winlmt, for preventing a belt slippage, so that the secondary-thrust calculation thrust ratio value τin is set to the higher ratio value (τin0+Δτ) that increases the secondary target thrust Wouttgt.

When it is determined by the detection-accuracy determining portion 96 that the detection accuracy of the actual-gear-ratio-calculation rotational speeds is not assured, if it is determined by the highest-gear-ratio determining portion 98 that the actual gear ratio γcvt is not the highest gear ratio γmax and determined by the transmission-shifting control portion 94 that the target gear ratio γcvttgt is not the highest gear ratio γmax, the transmission-shifting control portion 94 sets the he secondary-thrust calculation thrust ratio value τin to the base thrust ratio τin0, and sets the primary-thrust calculation thrust ratio value τout to the base thrust ratio τout0, as shown in FIG. 12. Since neither the actual gear ratio γcvt nor the target gear ratio γcvttgt is the highest gear ratio γmax, the primary-thrust calculation thrust ratio value Tout is not set to the higher ratio value (τout0+Δτ) taking account of the thrust ratio error Δτ, and the primary-thrust calculation thrust ratio value τin is not set to the higher ratio value (τin0+Δτ) taking account of the thrust ratio error Δτ.

When it is determined by the detection-accuracy determining portion 96 that the detection accuracy of the actual-gear-ratio-calculation rotational speeds is assured, the transmission-shifting control portion 94 sets the he secondary-thrust calculation thrust ratio value τin to the base thrust ratio τin0, and sets the primary-thrust calculation thrust ratio value τout to the base thrust ratio τout0, as shown in FIG. 12. Since the detection accuracy of the actual-gear-ratio-calculation rotational speeds is assured, the primary-thrust calculation thrust ratio value τout is not set to the higher ratio value (τout0+Δτ) taking account of the thrust ratio error Δτ, and the primary-thrust calculation thrust ratio value τin is not set to the higher ratio value (τin0+Δτ) taking account of the thrust ratio error Δτ.

Figure 13:
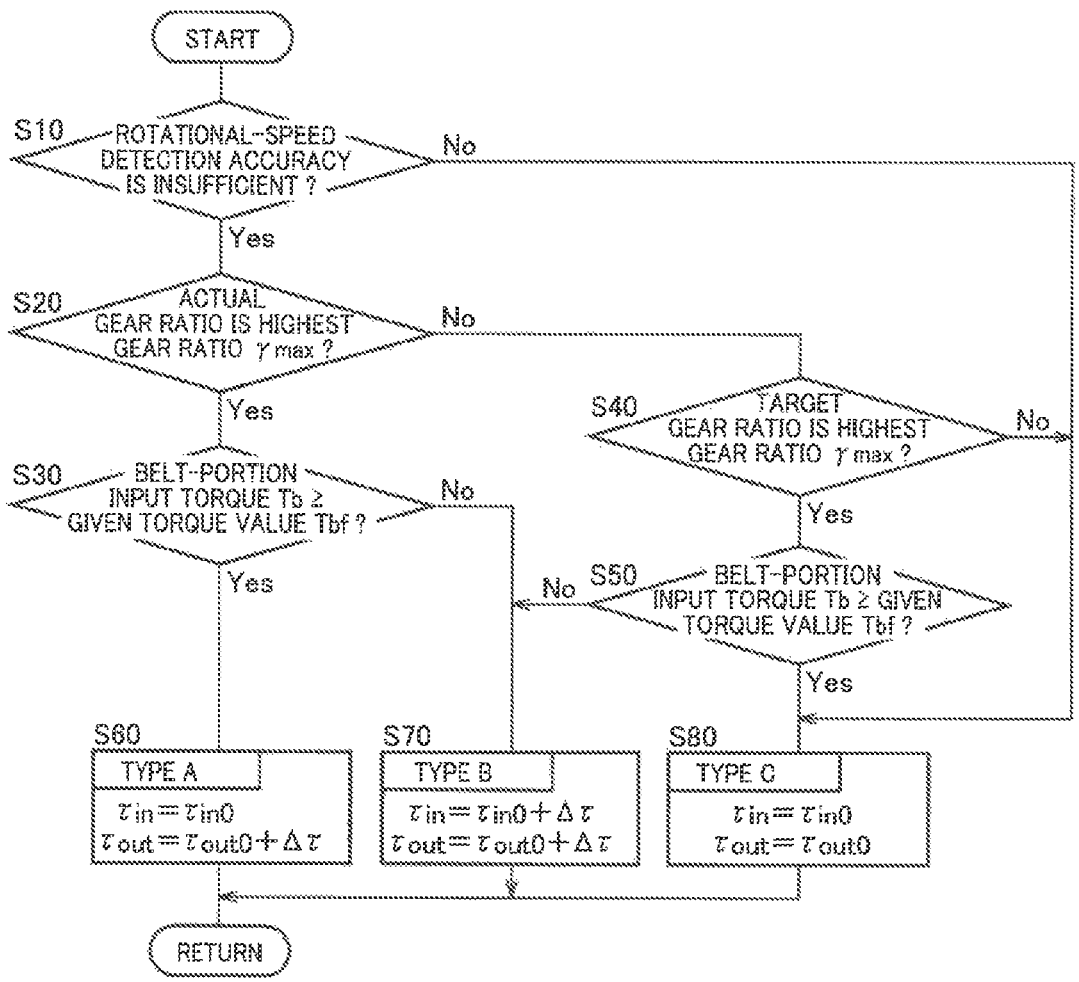
FIG. 13 is a flow chart showing a main part of a control routine executed by the control apparatus, namely, a control routine that is executed for keeping the gear ratio at the highest gear ratio without unnecessarily increasing a secondary thrust (i.e., the thrust applied to the secondary pulley) in a state in which a sufficient detection accuracy is not assured to detect actual-gear-ratio-calculation rotational speeds (i.e., rotational speeds that are used in calculation of an actual value of the gear ratio of the continuously-variable transmission mechanism)

FIG. 13 is a flow chart showing a main part of a control routine executed by the electronic control apparatus 90, namely, a control routine that is executed for keeping the gear ratio γcvt at the highest gear ratio γmax without unnecessarily increasing the secondary thrust Wout in the state in which a sufficient detection accuracy of the actual-gear-ratio-calculation rotational speeds is not assured. This control routine is executed, for example, in a repeated manner during running of the vehicle 10.

As shown in FIG. 13, the control flow is initiated with step S10 corresponding to function of the detection-accuracy determining portion 96, which is implemented to determine whether the detection accuracy of the actual-gear-ratio-calculation rotational speeds is currently insufficient or not. When an affirmative determination is obtained at step S10, step S20 corresponding to function of the highest-gear-ratio determining portion 98 is implemented to determine whether the actual gear ratio γcvt is the highest gear ratio γmax or not. When an affirmative determination is obtained at step S20, step S30 corresponding to function of the input-torque determining portion 99 is implemented to determine whether the belt-portion input torque Tb is equal to or higher than the given torque value Tbf. When a negative determination is obtained at step S20, the control flow goes to step S40 corresponding to function of the transmission-shifting control portion 94, which is implemented to determine whether the target gear ratio γcvttgt is the highest gear ratio γmax or not. When an affirmative determination is made at step S40, step S50 corresponding to function of the input-torque determining portion 99 is implemented to determine whether the belt-portion input torque Tb is equal to or higher than the given torque value Tbf. When an affirmative determination is made at step S30, the control flow goes to step S60 corresponding to function of the transmission-shifting control portion 94, which is implemented to set the secondary-thrust calculation thrust ratio value τin to the base thrust ratio τin0 and to set the primary-thrust calculation thrust ratio value τout to the higher ratio value (τout0+Δτ) that is higher than the base thrust ratio τout0. When a negative determination is made at step S30, the control flow goes to step S70 corresponding to function of the transmission-shifting control portion 94, which is implemented to set the secondary-thrust calculation thrust ratio value τin to the higher ratio value (τin0+Δτ) that is higher than the base thrust ratio τin0 and to set the primary-thrust calculation thrust ratio value τout to the higher ratio value (τout0+Δτ) that is higher than the base thrust ratio τout0. When a negative determination is made at step S10 or S40, and when an affirmative determination is made at step S50, the control flow goes to step S80 corresponding to function of the transmission-shifting control portion 94, which is implemented to set the secondary-thrust calculation thrust ratio value τin to the base thrust ratio τin0 and to set the primary-thrust calculation thrust ratio value τout to the base thrust ratio τout0.

As described above, in the present embodiment, when it is determined that the accuracy of the detection of the actual-gear-ratio-calculation rotational speeds is not assured, the transmission-shifting control portion 94 sets each of the secondary-thrust calculation thrust ratio value τin and the primary-thrust calculation thrust ratio value τout, by using the base thrust ratio τ0 that is the target-gear-ratio establishing ratio value of the thrust ratio, such that each of the set secondary-thrust calculation thrust ratio value τin and the set primary-thrust calculation thrust ratio value τout is dependent on the result of the determination as to whether the actual gear ratio γcvt is the highest gear ratio γmax or not and the result of the determination as to whether the belt-portion input torque Tb is lower than the given torque value Tbf or not. In other words, when it is determined that the accuracy of the detection of the actual-gear-ratio-calculation rotational speeds is not assured, the transmission-shifting control portion 94 sets each of the secondary-thrust calculation thrust ratio value τin and the primary-thrust calculation thrust ratio value τout, to a value whose difference from the base thrust ratio τ0 is dependent on the result of the determination as to whether the actual gear ratio γcvt is the highest gear ratio γmax or not and the result of the determination as to whether the input torque Tb is lower than the given torque value Tbf or not. Thus, the primary-thrust calculation thrust ratio value τout can be set to, for example, a value that reduces the primary thrust Win so as to reliably maintain the highest gear ratio γmax, dependently on the result of the determination as to whether the actual gear ratio γcvt is the highest gear ratio γmax or not. Further, the secondary-thrust calculation thrust ratio value τin can be set to, for example, a value that increases the secondary thrust Wout or a value that does not unnecessarily increase the secondary thrust Wout, dependently on the result of the determination as to whether the belt-portion input torque Tb is lower than the given torque value Tbf or not. Thus, in a state in which the actual-gear-ratio-calculation rotational speeds, which is used for calculation of the actual gear ratio γcvt of the continuously-variable transmission mechanism 24, is not assured, the highest gear ratio γmax can be maintained without unnecessarily increasing the secondary thrust Wout. Therefore, it is possible to improve both the fuel economy and the drivability while preventing or reducing a belt slippage.

In the present embodiment, when it is determined that the accuracy of the detection of the actual-gear-ratio-calculation rotational speeds is not assured, if it determined that the actual gear ratio γcvt is the highest gear ratio γmax and the belt-portion input torque Tb is not lower than the given torque value Tbf, the transmission-shifting control portion 94 is configured to set the secondary-thrust calculation thrust ratio value τin to the base thrust ratio τin0 and to set the primary-thrust calculation thrust ratio value τout to the higher ratio value (τout0+Δτ) that is higher than the base thrust ratio τout0. Thus, the primary thrust Win is reduced so as to reliably maintain the highest gear ratio γmax, without the secondary thrust Wout being unnecessarily increased.

In the present embodiment, when it is determined that the accuracy of the detection of the actual-gear-ratio-calculation rotational speeds is not assured, if it is determined that the actual gear ratio γcvt is the highest gear ratio γmax and the belt-portion input torque Tb is lower than the given torque value Tbf, the transmission-shifting control portion 94 is configured to set the secondary-thrust calculation thrust ratio value τin to the higher ratio value (τin0+Δτ) that is higher than the base thrust ratio τin0 and to set the primary-thrust calculation thrust ratio value τout to the higher ratio value (τout0+Δτ) that is higher than the base thrust ratio τout0. Thus, the secondary thrust Wout is increased and the primary thrust Win is reduced, so as to reliably maintain the highest gear ratio γmax.

In the present embodiment, when it is determined that the accuracy of the detection of the actual-gear-ratio-calculation rotational speeds is not assured, if it is determined that the actual gear ratio γcvt is not the highest gear ratio γmax, the target gear ratio γcvttgt is the highest gear ratio γmax and the belt-portion input torque Tb is not lower than the given torque value Tbf, the transmission-shifting control portion 94 is configured to set the secondary-thrust calculation thrust ratio value τin to the base thrust ratio τin0 and to set the primary-thrust calculation thrust ratio value τout to the base thrust ratio τout0. Thus, the secondary thrust Wout is not unnecessarily increased.

In the present embodiment, when it is determined that the accuracy of the detection of the actual-gear-ratio-calculation rotational speeds is not assured, if it is determined that the actual gear ratio γcvt is not the highest gear ratio γmax, the target gear ratio γcvttgt is the highest gear ratio γmax and the belt-portion input torque Tb is lower than the given torque value Tbf, the transmission-shifting control portion 94 is configured to set the secondary-thrust calculation thrust ratio value τin to the higher ratio value (τin0+Δτ) that is higher than the base thrust ratio τin0 and to set the primary-thrust calculation thrust ratio value τout to the higher ratio value (τout0+Δτ) that is higher than the base thrust ratio τout0. Thus, the secondary thrust Wout is increased to avoid a belt slippage, and the primary thrust Win is reduced to facilitate establishment of the target gear ratio γcvt.

In the present embodiment, when it is determined that the accuracy of the detection of the actual-gear-ratio-calculation rotational speeds is not assured, if it is determined that the actual gear ratio γcvt is not the highest gear ratio γmax and the target gear ratio γcvttgt is not the highest gear ratio γmax, the transmission-shifting control portion 94 is configured to set the secondary-thrust calculation thrust ratio value Tin to the base thrust ratio τin0 and to set the primary-thrust calculation thrust ratio value τout to the base thrust ratio τout0. Thus, the secondary thrust Wout is not unnecessarily increased.

In the present embodiment, when it is determined that the accuracy of the detection of the actual-gear-ratio-calculation rotational speeds is not assured, the transmission-shifting control portion 94 is configured to set each of the secondary-thrust calculation thrust ratio value τin and the primary-thrust calculation thrust ratio value τout, to one of the base thrust ratio τ0 and the higher ratio value (τ0+Δτ) that is higher than the base thrust ratio τ0, which is selected depending on the result of the determinations as to whether the actual gear ratio γcvt is the highest gear ratio γmax or not and the result of the determination as to whether the belt-portion input torque Tb is lower than the given torque value Tbf or not, such that a difference between the primary thrust Win and the secondary thrust Wout is made larger when at least one of the secondary-thrust calculation thrust ratio value τin and the primary-thrust calculation thrust ratio value τout is set to the higher ratio value (τ0+Δτ) than when each of the secondary-thrust calculation thrust ratio value τin and the primary-thrust calculation thrust ratio value τout is set to the base thrust ratio τ0. Thus, with at least one of the secondary-thrust calculation thrust ratio value τin and the primary-thrust calculation thrust ratio value τout being set to the higher ratio value (τ0+Δτ), the difference between the primary thrust Win and the secondary thrust Wout is made larger than when each of the secondary-thrust calculation thrust ratio value τin and the primary-thrust calculation thrust ratio value τout is set to the base thrust ratio τ0, namely, the highest gear ratio γmax can be more reliably maintained.

There will be described other embodiments of this invention. The same reference signs as used in the above-described first embodiment will be used in the following embodiments, to identify the functionally corresponding elements, and descriptions thereof are not provided.

Second Embodiment

In the drive-force transmitting apparatus 16, the operation state of the second clutch C2 is changed depending on, for example, the running mode of the vehicle 10. The second clutch C2 is fully engaged during the belt running mode, and is fully released during the gear running mode. Further, during execution of the switching control operation for switching the running mode between the gear running mode and the belt running mode, the second clutch C2 is in a state of transition from its engaged state to its released state, or in a state of transition from its released state to its engaged state. Thus, the belt-portion input torque Tb varies depending on the operation state of the second clutch C2. That is, the belt-portion input torque Tb is a torque value that is dependent on the operation state of the second clutch C2.

The transmission-shifting control portion 94 calculates the belt-portion input torque Tb depending on the operation state of the second clutch C2. Specifically, when the second clutch C2 is fully engaged, the transmission-shifting control portion 94 regards the turbine torque Tt as the belt-portion input torque Tb, namely, sets the turbine torque Tt as the input torque inputted to the continuously-variable transmission mechanism 24. When the second clutch C2 is in the state of transition between the engaged state and the released state, the transmission-shifting control portion 94 regards a converted value of the torque capacity of the second clutch C2 converted on the primary shaft 58, as the belt-portion input torque Tb, namely, sets the converted value as the input torque inputted to the continuously-variable transmission mechanism 24. In this case, the transmission-shifting control portion 94 calculates the torque capacity of the second clutch C2 based on the hydraulic-control command signal Scbd. Further, when the second clutch C2 is fully released, the transmission-shifting control portion 94 sets zero to the belt-portion input torque Tb, namely, sets zero as the input torque inputted to the continuously-variable transmission mechanism 24.

The input-torque determining portion 99 determines whether the belt-portion input torque Tb or the input torque inputted to the continuously-variable transmission mechanism 24, which is dependent on the operation state of the second clutch C2, is lower than the given torque value Tbf or not.

In the above-described first embodiment, the transmission-shifting control portion 94 sets each of the secondary-thrust calculation thrust ratio value τin and primary-thrust calculation thrust ratio value τout, depending on the result of the determination as to whether the belt-portion input torque Tb (turbine torque Tt) as the input torque inputted to the continuously-variable transmission mechanism 24 is lower than the given torque value Tbf or not, in a case of the belt running mode. That is, the control routine shown in the flow chart of FIG. 13 is for a case in which the second clutch C2 is fully engaged. In this second embodiment, the transmission-shifting control portion 94 sets each of the secondary-thrust calculation thrust ratio value τin and primary-thrust calculation thrust ratio value τout, depending on the result of the determination as to whether the input torque (inputted to the continuously-variable transmission mechanism 24), which is dependent on the operation state of the second clutch C2, is lower than the given torque value Tbf, by taking account of the operation state of the second clutch C2. That is, in this second embodiment, at steps S30 and S50, it is determined whether the belt-portion input torque Tb, which is dependent on the operation state of the second clutch C2, is lower than the given torque value Tbf or not.

Thus, in this second embodiment, even when the second clutch C2 is not fully engaged, it is possible to enjoy substantially the same technical advantages enjoyed when the second clutch C2 is fully engaged, namely, it is possible to enjoy substantially the same technical advantages provided in the above-described first embodiment.

Third Embodiment

When the second clutch C2 is in the state of transition between the engaged state and the released state, the belt-portion input torque Tb is likely to be considerably changed, so that the thrust ratio τ is likely to be considerably changed even with the belt-portion input torque Tb being not lower than the given torque value Tbf. Therefore, even when the belt-portion input torque Tb is not lower than the given torque value Tbf, it is preferable to take account of the thrust ratio error Δτ as in a state in which the belt-portion input torque Tb is so small that the change of the thrust ratio τout relative to the change of the belt-portion input torque Tb is made large. From another point of view, when the second clutch C2 is in the state of transition between the engaged state and the released state, there could be a delay of change of an actual hydraulic pressure value in response to the hydraulic-control command signal Scbd, thereby resulting in reduction of the torque accuracy, so that it is preferable to take account of the thrust ratio error Δτ. In this third embodiment, when the second clutch C2 is not fully engaged, it is regarded that there is a determination that belt-portion input torque Tb is lower than the given torque value Tbf, irrespective of whether the belt-portion input torque Tb is actually lower than the given torque value Tbf or not.

Specifically, the input-torque determining portion 99 further makes a determination as to whether the second clutch C2 is fully engaged or not. When determining that the second clutch C2 is fully engaged, the input-torque determining portion 99 makes a result of the determination effective. When determining that the second clutch C2 is not fully engaged, the input-torque determining portion 99 makes a determination that the belt-portion input torque Tb is lower than the given torque value Tbf, or regards that the belt-portion input torque Tb is lower than the given torque value Tbf, not only when the belt-portion input torque Tb is actually lower than the given torque value Tbf but also when the belt-portion input torque Tb is not actually lower than the given torque value Tbf. That is, when determining that the input-torque determining portion 99 is fully engaged and that the belt-portion input torque Tb is not lower than the given torque value Tbf, the input-torque determining portion 99 regards that the belt-portion input torque Tb is not lower than the given torque value Tbf just as the determination that the belt-portion input torque Tb is not lower than the given torque value Tbf. On the other hand, when determining that the input-torque determining portion 99 is not fully engaged and/or that the belt-portion input torque Tb is lower than the given torque value Tbf, the input-torque determining portion 99 regards that the belt-portion input torque Tb is lower than the given torque value Tbf irrespective of whether the belt-portion input torque Tb is actually lower than the given torque value Tbf or not.

Thus, when it is determined by the input-torque determining portion 99 that the second engagement device C2 is fully engaged, the transmission-shifting control portion 94 sets each of the secondary-thrust calculation thrust ratio value τin and the primary-thrust calculation thrust ratio value τout, dependently on the result of the determination as to whether the input torque Tb is lower than the given torque value Tbf or not, namely, sets each of the secondary-thrust calculation thrust ratio value τin and the primary-thrust calculation thrust ratio value τout, to one of the base thrust ratio τ0 and the higher ratio value (τ0+Δτ) that is higher than the base thrust ratio τ0, which is selected depending on the result of the determination as to whether the input torque Tb is lower than the given torque value Tbf or not. On the other hand, when it is determined by the input-torque determining portion 99 that the second engagement device C2 is not fully engaged, the transmission-shifting control portion 94 sets each of the secondary-thrust calculation thrust ratio value τin and the primary-thrust calculation thrust ratio value τout, based on the determination that the input torque Tb is lower than the given torque value Tbf, irrespective of whether the input torque Tb is actually lower than the given torque value Tbf or not, namely, sets each of the secondary-thrust calculation thrust ratio value τin and the primary-thrust calculation thrust ratio value τout, to one of the base thrust ratio τ0 and the higher ratio value (τ0+Δτ) which is selected based on the determination that the input torque Tb is lower than the given torque value Tbf, irrespective of whether the input torque Tb is actually lower than the given torque value Tbf or not.

Figure 14:
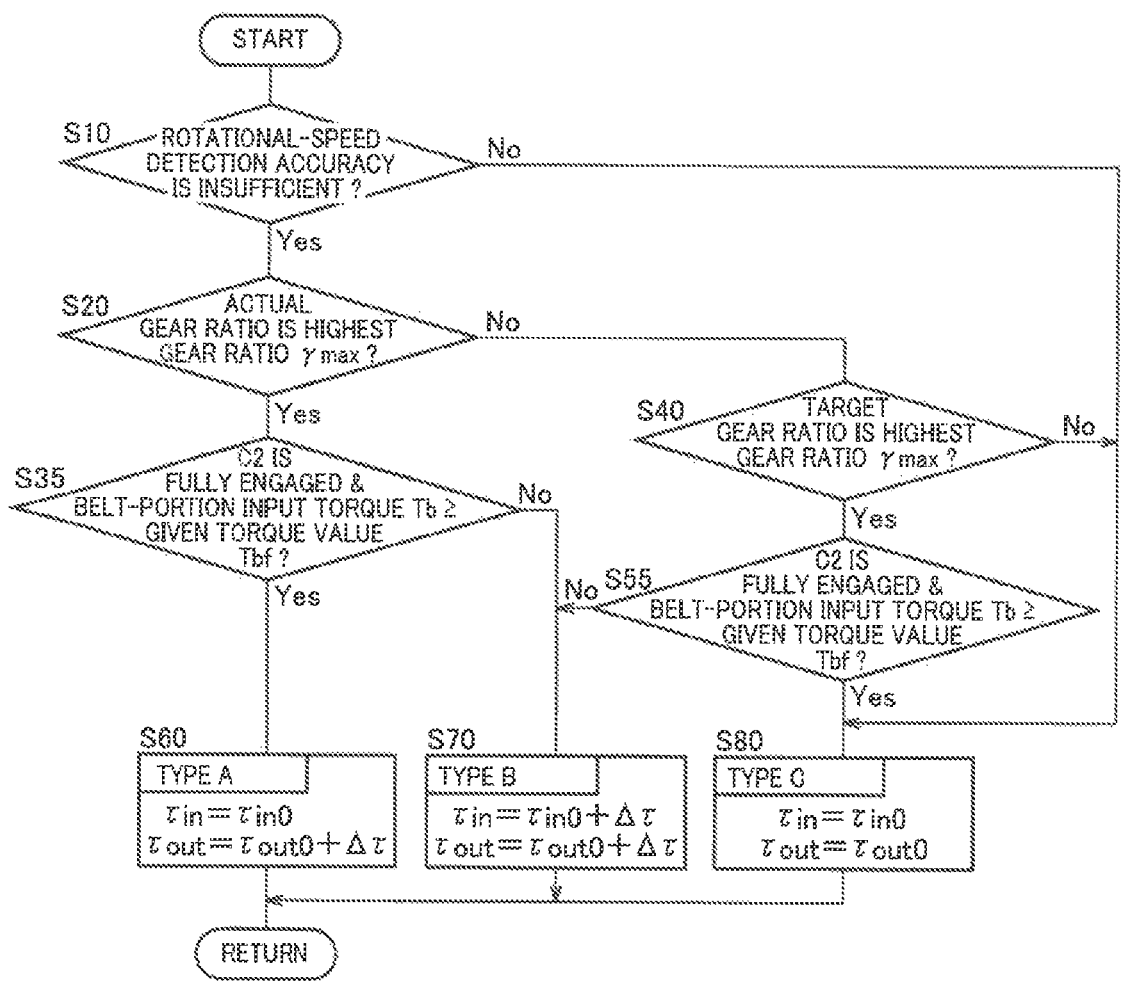
FIG. 14 is a flow chart showing a main part of a control routine executed by the control apparatus, namely, a control routine that is executed for keeping the gear ratio at the highest gear ratio without unnecessarily increasing the secondary thrust in a state in which a sufficient detection accuracy is not assured to detect the actual-gear-ratio-calculation rotational speeds, wherein the control routine is according to another embodiment that is other than the embodiment shown in FIG. 13.

FIG. 14 is a flow chart showing a main part of a control routine executed by the electronic control apparatus 90, namely, a control routine that is executed for keeping the gear ratio at the highest gear ratio without unnecessarily increasing the secondary thrust in a state in which a sufficient detection accuracy is not assured to detect the actual-gear-ratio-calculation rotational speeds, wherein this control routine is different from the control routine shown in FIG. 13 which is according to the first embodiment.

As shown in FIG. 14, the control flow is initiated with step S10 corresponding to function of the detection-accuracy determining portion 96, which is implemented to determine whether the detection accuracy of the actual-gear-ratio-calculation rotational speeds is currently insufficient or not. When an affirmative determination is obtained at step S10, step S20 corresponding to function of the highest-gear-ratio determining portion 98 is implemented to determine whether the actual gear ratio γcvt is the highest gear ratio γmax or not. When an affirmative determination is obtained at step S20, step S35 corresponding to function of the input-torque determining portion 99 is implemented to determine whether the second clutch C2 is fully engaged and the belt-portion input torque Tb is equal to or higher than the given torque value Tbf. When a negative determination is obtained at step S20, the control flow goes to step S40 corresponding to function of the transmission-shifting control portion 94, which is implemented to determine whether the target gear ratio γcvttgt is the highest gear ratio γmax or not. When an affirmative determination is made at step S40, step S55 corresponding to function of the input-torque determining portion 99 is implemented to determine whether the second clutch C2 is fully engaged and the belt-portion input torque Tb is equal to or higher than the given torque value Tbf. When an affirmative determination is made at step S35, the control flow goes to step S60 corresponding to function of the transmission-shifting control portion 94, which is implemented to set the secondary-thrust calculation thrust ratio value τin to the base thrust ratio τin0 and to set the primary-thrust calculation thrust ratio value τout to the higher ratio value (τout0+Δτ) that is higher than the base thrust ratio τout0. When a negative determination is made at step S35, the control flow goes to step S70 corresponding to function of the transmission-shifting control portion 94, which is implemented to set the secondary-thrust calculation thrust ratio value τin to the higher ratio value (τin0+Δτ) that is higher than the base thrust ratio τin0 and to set the primary-thrust calculation thrust ratio value τout to the higher ratio value (τout0+Δτ) that is higher than the base thrust ratio τout0. When a negative determination is made at step S10 or S40, and when an affirmative determination is made at step S55, the control flow goes to step S80 corresponding to function of the transmission-shifting control portion 94, which is implemented to set the secondary-thrust calculation thrust ratio value τin to the base thrust ratio τin0 and to set the primary-thrust calculation thrust ratio value τout to the base thrust ratio τout0.

As described above, in this third embodiment, when it is determined that the accuracy of the detection of the actual-gear-ratio-calculation rotational speeds is not assured, if it is determined that the second clutch C2 is fully engaged, the transmission-shifting control portion 94 is configured to set each of the secondary-thrust calculation thrust ratio value τin and the primary-thrust calculation thrust ratio value τout, to one of the base thrust ratio τ0 and the higher ratio value (τ0+Δτ) that is higher than the base thrust ratio τ0, which is selected depending on the result of the determination as to whether the belt-portion input torque Tb is lower than the given torque value Tbf or not. Thus, in this case, for example, the primary-thrust calculation thrust ratio value τout can be set to the higher ratio value (τout0+Δτ) for increasing the primary thrust Win while the secondary-thrust calculation thrust ratio value τin can be set to the higher ratio value (τin0+Δτ) for increasing the secondary thrust Wout or to the base thrust ratio τin0 for not unnecessarily increasing the secondary thrust Wout, such that the highest gear ratio γmax is reliably maintained. On the other hand, when it is determined that the accuracy of the detection of the actual-gear-ratio-calculation rotational speeds is not assured, if it is determined that the second clutch C2 is not fully engaged, it is regarded that there is the determination that the belt-portion input torque Tb is lower than the given torque value Tbf, irrespective of whether the belt-portion input torque Tb is actually lower than the given torque value Tbf or not, and the transmission-shifting control portion 94 is configured to set each of the secondary-thrust calculation thrust ratio value τin and the primary-thrust calculation thrust ratio value τout, to one of the base thrust ratio τin0 and the higher ratio value (τ0+Δτ), which is selected based on the determination that the belt-portion input torque Tb is lower than the given torque value Tbf. Therefore, each of the secondary-thrust calculation thrust ratio value $\tau in$ and the primary-thrust calculation thrust ratio value $\tau out$ can be set to a value suitable for a state in which the belt-portion input torque Tb is lower than the given torque value Tbf, when the second clutch C2 is not fully engaged, namely, when the belt-portion input torque Tb is substantially not higher than a value corresponding to a torque capacity of the second clutch C2.

While the preferred embodiments of this invention have been described in detail by reference to the drawings, it is to be understood that the invention may be otherwise embodied.

For example, in the above-described embodiments, the present invention is applied to the electronic control apparatus 90 for the drive-force transmitting apparatus 16 defining the plurality of drive-force transmitting paths that include the first and second drive-force transmitting paths PT1, PT2 provided in parallel with each other between the input shaft 22 and the output shaft 30, wherein the drive force is transmittable by the gear mechanism 28 through the first drive-force transmitting path PT1, and the drive force is transmittable by the continuously-variable transmission mechanism 24 through the second drive-force transmitting path PT2. However, for example, the present invention can be applied also to a control apparatus for a drive-force transmitting apparatus defining a single drive-force transmitting path provided between the drive force source and the drive wheels, wherein the drive force is transmittable by a belt-type continuously-variable transmission mechanism such as the continuously-variable transmission mechanism 24. For example, in the drive-force transmitting apparatus in which a clutch as well as the continuously-variable transmission mechanism is provided in the drive-force transmitting path between the engine and the drive wheels so as to be disposed in series with the continuously-variable transmission mechanism, the above-descried clutch corresponds to the second clutch C2 included in the drive-force transmitting apparatus 16 in the above-described embodiments. The above-described clutch disposed in series with the continuously-variable transmission mechanism may be a frictional engagement device such as a starting clutch and an input clutch, or may be a frictional engagement device included in a forward/reverse switching device like the above-described forward/reverse switching device 26. That is, the present invention is applicable to a control apparatus for any drive-force transmitting apparatus, as long as the drive-force transmitting apparatus includes a continuously-variable transmission mechanism configured to transmit the drive force of the drive force source toward the drive wheels, and which includes the primary pulley, the secondary pulley and the transfer element that is looped over the primary and secondary pulleys.

Further, in the above-described embodiments, when it is determined that the detection accuracy of the actual-gear-ratio-calculation rotational speeds is not assured, the determination as to whether the actual gear ratio $\gamma cvt$ is the highest gear ratio $\gamma max$ or not is made based on the determination as to whether the actual gear ratio $\gamma cvt$ has already become the highest gear ratio $\gamma max$ or not before it is determined that the detection accuracy of the actual-gear-ratio-calculation rotational speeds is not assured. However, for example, where a sensor is provided to detect the actual position Xin of the movable sheave 60b of the primary pulley 60, the determination as to whether the actual gear ratio $\gamma cvt$ is the highest gear ratio $\gamma max$ or not may be made based on a determination as to whether the detected actual position Xin is a position Xinmax that establishes the highest gear ratio $\gamma max$.

In the control routine shown in FIG. 14 of the above-described third embodiment, step S70 is implemented when the negative determination is made at step S35. However, this control routine may be modified. For example, in a state in which the vehicle 10 is stopped with the second clutch C2 being in the state of transition between the engaged state and the released state, a rotational speed of an engine-side member of the second clutch C2 (which is connected to the secondary pulley 64 of the continuously-variable transmission mechanism 24 as shown in FIG. 1) is higher than a rotational speed of a drive-wheel-side member of the second clutch C2 (which is connected to the output shaft 30 as shown in FIG. 1). It can be considered that the driving state of the vehicle 10 is assured with the rotational speed of the engine-side member of the second clutch C2 being higher than the rotational speed of the drive-wheel-side member of the second clutch C2. Therefore, the determination made at step S35 in the control routine shown in FIG. 14 may be modified such that it is determined whether the second clutch C2 is at least partially engaged and the belt-portion input torque Tb is equal to or higher than the given torque value Tbf, so that an affirmative determination is made at step S35 not only when the second clutch C2 is fully engaged but also when the second clutch C2 in the state of transition between the engaged state and the released state, as long as the belt-portion input torque Tb is not lower than the given torque value Tbf. By this modification, step S60 could be implemented when the second clutch C2 is in the state of transition between the released state and the engaged state, whereby the fuel economy could be improved.

In the above-described embodiments, the thrust ratio error $\Delta\tau$ may be either a constant value or a value variable dependently on, for example, the base thrust ratio $\tau 0$. Further, the thrust ratio error $\Delta\tau$ to be added to the base thrust ratio $\tau in0$ and the thrust ratio error $\Delta\tau$ to be added to the base thrust ratio $\tau out0$ may be either the same as each other or different from each other. When they are different from each other, each of them may be dependent on a corresponding one of the base thrust ratio $\tau in0$ and the base thrust ratio $\tau out0$.

In the above-described embodiments, the second clutch C2 is disposed in a drive-force transmitting path between the secondary pulley 64 and the output shaft 30. However, this arrangement is not essential. It is possible to employ a modified arrangement in which, for example, the second clutch C2 is disposed in a drive-force transmitting path between the primary pulley 60 and the input shaft 22. In this modified arrangement, the secondary shaft 62 is connected integrally with the output shaft 30, and the primary shaft 58 is connected to the input shaft 22 through the second clutch C2.

In the above-described embodiments, the gear mechanism 28 is a gear mechanism which provides a single gear ratio that is higher than the highest gear ratio $\gamma max$ of the continuously-variable transmission mechanism 24. However, the gear mechanism 28 may be, for example, a gear mechanism which provides a plurality of different gear ratios. That is, the gear mechanism 28 may be a gear mechanism in which a shifting action is to be executed from one of two or more gear positions to the other. Further, the gear mechanism 28 may be a gear mechanism that provides a gear ratio that is lower than the lowest gear ratio $\gamma min$ of the continuously-variable transmission mechanism 24 and another gear ratio that is higher than the highest gear ratio γmax of the continuously-variable transmission mechanism 24.

In the above-described embodiments, the running mode of the drive-force transmitting apparatus 16 is switched between the gear running mode and the belt running mode, by using the shifting map in which the shift-up lines and shift-down lines are defined. However, the running mode of the drive-force transmitting apparatus 16 may be switched by setting a gear ratio satisfying the target drive force Fwtgt that is calculated based on the running speed V and the accelerator operation amount θacc.

In the above-described embodiments, the torque converter 20 is used as fluid-operated drive-force transmitting device. However, in place of the torque converter 20, any one of other types of fluid-operated drive-force transmitting devices such as a fluid coupling, which do not have a torque boosting function, may be used, for example. Further, the fluid-operated drive-force transmitting device does not have to be necessarily provided. In the above-described embodiment, the dog clutch D1 is provided in the first drive-force transmitting path PT1 through which the drive force is to be transmitted by the gear mechanism 28. However, the provision of the dog clutch D1 is not essential for carrying out the invention.

It is to be understood that the embodiments described above are given for illustrative purpose only, and that the present invention may be embodied with various modifications and improvements which may occur to those skilled in the art.

NOMENCLATURE OF ELEMENTS

12: engine (drive force source)
14: drive wheels
16: vehicle drive-force transmitting apparatus
22: input shaft (input rotary member)
24: continuously-variable transmission mechanism
28: gear mechanism
30: output shaft (output rotary member)
60: primary pulley
60c: hydraulic actuator
64: secondary pulley
64c: hydraulic actuator
66: transmission belt (transfer element)
90: electronic control apparatus (control apparatus)
94: transmission shifting control portion
C1: first clutch (first engagement device)
C2: second clutch (second engagement device)
PT1: first drive-force transmitting path
PT2: second drive-force transmitting path

What is claimed is:

1. A control apparatus for a drive-force transmitting apparatus that is to be provided in a vehicle having a drive force source and drive wheels,
wherein the drive-force transmitting apparatus includes:
a continuously-variable transmission mechanism which is configured to transmit a drive force of the drive force source toward the drive wheels, and which includes a primary pulley, a secondary pulley, and a transfer element that is looped over the primary and secondary pulleys, such that the primary pulley includes a primary hydraulic actuator configured to generate a primary thrust, based on which the transfer element is to be clamped by the primary pulley, and such that the secondary pulley includes a secondary hydraulic actuator configured to generate a secondary thrust, based on which the transfer element is to be clamped by the secondary pulley,
wherein said control apparatus includes:
a detection-accuracy determining portion configured to make a determination as to whether an accuracy of detection of at least one rotational speed that is to be used for calculation of an actual value of a gear ratio of the continuously-variable transmission mechanism, is assured or not;
a highest-gear-ratio determining portion configured to make a determination as to whether an actual value of a gear ratio of the continuously-variable transmission mechanism is a highest gear ratio or not;
an input-torque determining portion configured to make a determination as to whether an input torque inputted to the continuously-variable transmission mechanism is lower than a given torque value or not; and
a transmission-shifting control portion configured to control a thrust ratio that is a ratio of the secondary thrust to the primary thrust, and to calculate, based on the input torque, a target-gear-ratio establishing ratio value of the thrust ratio that is for establishing a target value of the gear ratio, and
wherein, when it is determined that the accuracy of the detection of the at least one rotational speed is not assured, said transmission-shifting control portion is configured to set each of (i) a secondary-thrust calculation thrust ratio value of the thrust ratio used for calculation of the secondary thrust based on the primary thrust and (ii) a primary-thrust calculation thrust ratio value of the thrust ratio used for calculation of the primary thrust based on the secondary thrust, by using a base thrust ratio that is the target-gear-ratio establishing ratio value of the thrust ratio, such that each of the set secondary-thrust calculation thrust ratio value and the set primary-thrust calculation thrust ratio value is dependent on a result of the determination as to whether the actual value of the gear ratio is the highest gear ratio or not and a result of the determination as to whether the input torque is lower than the given torque value or not.

2. The control apparatus according to claim 1, wherein, when it is determined that the accuracy of the detection of the at least one rotational speed is not assured, if it is determined that the actual value of the gear ratio is the highest gear ratio and the input torque is not lower than the given torque value, said transmission-shifting control portion is configured to set the secondary-thrust calculation thrust ratio value to the target-gear-ratio establishing ratio value and to set the primary-thrust calculation thrust ratio value to a higher ratio value that is higher than the target-gear-ratio establishing ratio value.

3. The control apparatus according to claim 1, wherein, when it is determined that the accuracy of the detection of the at least one rotational speed is not assured, if it is determined that the actual value of the gear ratio is the highest gear ratio and the input torque is lower than the given torque value, said transmission-shifting control portion is configured to set the secondary-thrust calculation thrust ratio value to a higher ratio value that is higher than the target-gear-ratio establishing ratio value and to set the primary-thrust calculation thrust ratio value to a higher ratio value that is higher than the target-gear-ratio establishing ratio value.

4. The control apparatus according to claim 1,
wherein said transmission-shifting control portion is configured to make a determination as to whether the target value of the gear ratio of the continuously-variable transmission mechanism is the highest gear ratio or not, and
wherein, when it is determined that the accuracy of the detection of the at least one rotational speed is not assured, if it is determined that the actual value of the gear ratio is not the highest gear ratio, the target value of the gear ratio is the highest gear ratio and the input torque is not lower than the given torque value, said transmission-shifting control portion is configured to set the secondary-thrust calculation thrust ratio value to the target-gear-ratio establishing ratio value and to set the primary-thrust calculation thrust ratio value to the target-gear-ratio establishing ratio value.

5. The control apparatus according to claim 1,
wherein said transmission-shifting control portion is configured to make a determination as to whether the target value of the gear ratio of the continuously-variable transmission mechanism is the highest gear ratio or not, and
wherein, when it is determined that the accuracy of the detection of the at least one rotational speed is not assured, if it is determined that the actual value of the gear ratio is not the highest gear ratio, the target value of the gear ratio is the highest gear ratio and the input torque is lower than the given torque value, said transmission-shifting control portion is configured to set the secondary-thrust calculation thrust ratio value to a higher ratio value that is higher than the target-gear-ratio establishing ratio value and to set the primary-thrust calculation thrust ratio value to a higher ratio value that is higher than the target-gear-ratio establishing ratio value.

6. The control apparatus according to claim 1,
wherein said transmission-shifting control portion is configured to make a determination as to whether the target value of the gear ratio of the continuously-variable transmission mechanism is the highest gear ratio or not, and
wherein, when it is determined that the accuracy of the detection of the at least one rotational speed is not assured, if it is determined that the actual value of the gear ratio is not the highest gear ratio and the target value of the gear ratio is not the highest gear ratio, said transmission-shifting control portion is configured to set the secondary-thrust calculation thrust ratio value to the target-gear-ratio establishing ratio value and to set the primary-thrust calculation thrust ratio value to the target-gear-ratio establishing ratio value.

7. The control apparatus according to claim 1, wherein, when it is determined that the accuracy of the detection of the at least one rotational speed is not assured, said transmission-shifting control portion is configured to set each of the secondary-thrust calculation thrust ratio value and the primary-thrust calculation thrust ratio value, to one of the target-gear-ratio establishing ratio value and a higher ratio value that is higher than the target-gear-ratio establishing ratio value, which is selected depending on the result of the determinations as to whether the actual value of the gear ratio is the highest gear ratio or not and the result of the determination as to whether the input torque is lower than the given torque value or not, such that a difference between the primary thrust and the secondary thrust is made larger when at least one of the secondary-thrust calculation thrust ratio value and the primary-thrust calculation thrust ratio value is set to the higher ratio value than when each of the secondary-thrust calculation thrust ratio value and the primary-thrust calculation thrust ratio value is set to the target-gear-ratio establishing ratio value.

8. The control apparatus according to claim 1,
wherein the drive-force transmitting apparatus further includes: an input rotary member to which the drive force is to be transmitted from the drive force source; an output rotary member from which the drive force is to be outputted to the drive wheels; and a gear mechanism configured to provide at least one gear ratio,
wherein the drive-force transmitting apparatus defines a plurality of drive-force transmitting paths that are provided in parallel with each other between the input rotary member and the output rotary member,
wherein the plurality of drive-force transmitting paths include a first drive-force transmitting path through which the drive force is to be transmitted by the gear mechanism from the input rotary member toward the output rotary member when the first drive-force transmitting path is established by engagement of a first engagement device, and
wherein the plurality of drive-force transmitting paths includes a second drive-force transmitting path through which the drive force is to be transmitted by the continuously-variable transmission mechanism from the input rotary member toward the output rotary member when the second drive-force transmitting path is established by engagement of a second engagement device.

9. The control apparatus according to claim 8,
wherein said input-torque determining portion is configured to make a determination as to whether the second engagement device is fully engaged or not,
wherein, when it is determined that the accuracy of the detection of the at least one rotational speed is not assured, if it is determined that the second engagement device is fully engaged, said transmission-shifting control portion is configured to set each of the secondary-thrust calculation thrust ratio value and the primary-thrust calculation thrust ratio value, dependently on a result of the determination as to whether the input torque is lower than the given torque value or not, and
wherein, when it is determined that the accuracy of the detection of the at least one rotational speed is not assured, if it is determined that the second engagement device is not fully engaged, it is regarded that there is a determination that the input torque is lower than the given torque value, irrespective of whether the input torque is actually lower than the given torque value or not, and said transmission-shifting control portion is configured to set each of the secondary-thrust calculation thrust ratio value and the primary-thrust calculation thrust ratio value, based on the determination that the input torque is lower than the given torque value.

10. The control apparatus according to claim 1,
wherein, when it is determined that the accuracy of the detection of the at least one rotational speed is not assured, if it is determined that the actual value of the gear ratio is the highest gear ratio and the input torque is not lower than the given torque value, said transmission-shifting control portion is configured to set the secondary-thrust calculation thrust ratio value to the target-gear-ratio establishing ratio value and to set the primary-thrust calculation thrust ratio value to a higher ratio value that is higher than the target-gear-ratio establishing ratio value, wherein, when it is determined that the accuracy of the detection of the at least one rotational speed is not assured, if it is determined that the actual value of the gear ratio is the highest gear ratio and the input torque is lower than the given torque value, said transmission-shifting control portion is configured to set the secondary-thrust calculation thrust ratio value to the higher ratio value and to set the primary-thrust calculation thrust ratio value to the higher ratio value, wherein said transmission-shifting control portion is configured to make a determination as to whether the target value of the gear ratio of the continuously-variable transmission mechanism is the highest gear ratio or not, and wherein, when it is determined that the accuracy of the detection of the at least one rotational speed is not assured, if it is determined that the actual value of the gear ratio is not the highest gear ratio, the target value of the gear ratio is the highest gear ratio and the input torque is not lower than the given torque value, said transmission-shifting control portion is configured to set the secondary-thrust calculation thrust ratio value to the target-gear-ratio establishing ratio value and to set the primary-thrust calculation thrust ratio value to the target-gear-ratio establishing ratio value.

11. The control apparatus according to claim 1, wherein said detection-accuracy determining portion determines that the accuracy of detection of the at least one rotational speed is not assured, when at least one of the at least one rotational speed is lower than a minimum speed value.

12. The control apparatus according to claim 1, wherein, when it is determined that the accuracy of the detection of the at least one rotational speed is not assured, said transmission-shifting control portion is configured to set each of the secondary-thrust calculation thrust ratio value and the primary-thrust calculation thrust ratio value to a value whose difference from the base thrust ratio is dependent on the result of the determination as to whether the actual value of the gear ratio is the highest gear ratio or not and the result of the determination as to whether the input torque is lower than the given torque value or not.

* * * * *